US012719549B2

(12) United States Patent
Saab et al.

(10) Patent No.: US 12,719,549 B2
(45) Date of Patent: Aug. 25, 2026

(54) ADAPTIVE BEAMFORMING USING SMART REPEATERS

(71) Applicant: Samsung Electronics Co., Ltd., Suwon-si (KR)

(72) Inventors: Sandy Saab, Plano, TX (US); Shadi Abu-Surra, Plano, TX (US); Gang Xu, Allen, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 18/491,675

(22) Filed: Oct. 20, 2023

(65) Prior Publication Data

US 2024/0146381 A1 May 2, 2024

Related U.S. Application Data

(60) Provisional application No. 63/419,990, filed on Oct. 27, 2022.

(51) Int. Cl.

| | |
|---|---|
| ***H04B 7/06*** | (2006.01) |
| ***H04W 72/044*** | (2023.01) |
| ***H04W 72/51*** | (2023.01) |

(52) U.S. Cl.
CPC ........ *H04B 7/0695* (2013.01); *H04W 72/046* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 10,484,032 | B2 | 11/2019 | Nourbakhsh |
| 11,553,362 | B2 | 1/2023 | Chandra et al. |

(Continued)

FOREIGN PATENT DOCUMENTS

| | | | |
|---|---|---|---|
| CN | 102177742 | * | 9/2011 |
| WO | 2024076171 A1 | | 4/2024 |

OTHER PUBLICATIONS

Dong et. al."Advanced Tri-Sectoral Multi-User Millimeter-Wave Smart Repeater," arXiv.2210.04859, Oct. 2022, 6 pages.

(Continued)

*Primary Examiner* — Andre Tacdiran

(57) ABSTRACT

A SmarterFi gateway integrates a WiFi access point and smart repeater, and executes a method therefor. The method includes receiving, from a user equipment (UE) via a first wireless communication channel, wireless fidelity (WiFi) signals that include information indicating a location of the UE. The WiFi signals are received by a transceiver that includes a first antenna array for communication with the UE, and a second antenna array for communication with a gNB. The method includes transmitting, to the gNB via the second antenna array, uplink data and control information that includes the UE location information. The method includes receiving, from the gNB via the second antenna array, downlink information intended for the UE. The method includes forward-transmitting, to the UE via a second wireless communication channel, the downlink information via a beam formed at the first antenna array to serve the UE at the location of the UE.

20 Claims, 9 Drawing Sheets

(56) References Cited

U.S. PATENT DOCUMENTS

| | | | | |
|---|---|---|---|---|
| 11,626,921 | B2 | 4/2023 | Hinman et al. | |
| 2020/0169833 | A1* | 5/2020 | Mellqvist | H04W 4/025 |
| 2020/0212994 | A1* | 7/2020 | Ashworth | H04B 7/15542 |
| 2020/0274609 | A1* | 8/2020 | Youtz | H04W 16/26 |
| 2021/0227628 | A1* | 7/2021 | Sevindik | H04W 88/10 |
| 2021/0297870 | A1 | 9/2021 | Luo et al. | |
| 2022/0059943 | A1 | 2/2022 | Saab et al. | |
| 2022/0240305 | A1* | 7/2022 | Black | H04B 7/155 |
| 2022/0408273 | A1 | 12/2022 | Nedelcu et al. | |

OTHER PUBLICATIONS

Asghar et al., "Evolution of Wireless Communication to 6G: Potential Applications and Research Directions," Sustainability, vol. 14, No. 10, May 2022, 26 pages.

Rappaport et al., "Wireless Communications and Applications Above 100 GHz: Opportunities and Challenges for 6G and Beyond," IEEE Access, vol. 7, Jun. 2019, pp. 78729-78757.

Zeng et al., "Reconfigurable Intelligent Surface (RIS) Assisted Wireless Coverage Extension: RIS Orientation and Location Optimization," IEEE Communications Letters, vol. 25, No. 1, Jan. 2021, 6 pages.

Kishk et al., "Exploiting Randomly-located Blockages for Large-Scale Deployment of Intelligent Surfaces," arXiv:2001.10766, Jul. 2020, 31 pages.

Saab et al., "An Inverted L-Shaped Multi-Layer Reconfigurable Intelligent Surface for THz Communications," 2022 Asilomar Conference on Signals, Systems, and Computers, Oct. 2022, pp. 1060-1063.

Tataria et al., "6G Wireless Systems: Vision, Requirements, Challenges, Insights, and Opportunities", Proceedings of the IEEE, vol. 109, No. 7, Jul. 2021, pp. 1166-1199.

Naqvi et al., "Achieving 5G NR mmWave Indoor Coverage Under Integrated Access Backhaul", IEEE Systems Journal, vol. 15, No. 4, Dec. 2021, pp. 5429-5439.

Flamini et al., "Towards a Heterogeneous Smart Electromagnetic Environment for Millimeter-Wave Communications: An Industrial Viewpoint", IEEE Transactions on Antennas and Propagation, vol. 70, No. 10, Oct. 2022, 12 pages.

Saab et al., "Path Towards Tbps Communications: LoS MIMO Theory, Simulation and Measurement Analysis," 2022 IEEE Globecom Workshops, Dec. 2022, pp. 1796-1801.

Wang et al., "Wi-Fi Access Point Roaming: Challenges and Potential Solutions," 2015 18th International Conference on Network-Based Information Systems, Sep. 2015, pp. 158-161.

Zafari et al., "A Survey of Indoor Localization Systems and Technologies," in IEEE Communications Surveys & Tutorials, vol. 21, No. 3, pp. Third Quarter 2019, pp. 2568-2599.

International Search Report and Written Opinion issued Feb. 5, 2024 regarding International Application No. PCT/KR2023/016821, 7 pages.

Extended European Search Report issued Nov. 11, 2025 regarding Application No. 23883155.6, 10 pages.

* cited by examiner

ADAPTIVE BEAMFORMING USING SMART REPEATERS

CROSS-REFERENCE TO RELATED APPLICATION(S) AND CLAIM OF PRIORITY

This application claims priority under 35 U.S.C. § 119(e) to U.S. Provisional Patent Application No. 63/419,990 filed on Oct. 27, 2022. The above-identified provisional patent application is hereby incorporated by reference in its entirety.

TECHNICAL FIELD

This disclosure relates generally to wireless communication systems. More specifically, this disclosure relates to adaptive beamforming using smart repeaters.

BACKGROUND

Realizing peak data rates in future wireless technologies is very challenging as applications will need to access more spectrum. Accomplishing such speeds requires the design of stable systems with large bandwidths at higher frequencies such as the millimeter wave (mmWave) frequency bands (30-100 GHz). The mmWave spectrum is attractive because it accommodates antenna arrays with high gains and precise beamforming capabilities. At mmWave frequencies, however, the signal propagating from an outdoor to an indoor environment suffers significant attenuation and blockage. Coverage limitations at mmWave frequencies is due to higher free space path loss and sensitivity to obstacles (such as human body, building walls, etc.).

Wireless communication innovative technologies are being developed at high frequency bands. Both 5G and future 6G networks rely on unlocking new spectra (for example, mmWave, sub-THz, and THz bands). At these high frequencies, however, radio signal propagation suffers from strong path-loss and attenuation. These propagating radio signals are also weakened by link blockage. As a result, communication is only stable and efficient over a limited range. Hence, deploying additional network infrastructure has become a solution.

SUMMARY

This disclosure provides adaptive beamforming using smart repeaters.

In one embodiment, a method for is provided. The method includes receiving, from a user equipment (UE) via a first wireless communication channel, wireless fidelity (WiFi) signals that include information indicating a location of the UE. The WiFi signals received by a transceiver that includes a first antenna array for communication with the UE, and a second antenna array for communication with a base station. The method includes transmitting, to the base station via the second antenna array, uplink data and control information that includes the UE location information. The method includes receiving, from the base station via the second antenna array, downlink information intended for the UE. The method includes forward-transmitting, to the UE via a second wireless communication channel, the downlink information via a beam formed at the first antenna array to serve the UE at the location of the UE.

In another embodiment, an electronic device is provided. The electronic device includes a transceiver that includes a first antenna array for communication with a UE, and a second antenna array for communication with a base station. The electronic device includes a processor operably connected to the transceiver. The processor is configured to receive, from the UE via a first wireless communication channel, WiFi signals that include information indicating a location of the UE. The processor is configured to transmit, to the base station via the second antenna array, uplink data and control information that includes the UE location information. The processor is configured to receive, from the base station via the second antenna array, downlink information intended for the UE. The processor is configured to forward-transmit, to the UE via a second wireless communication channel, the downlink information via a beam formed at the first antenna array to serve the UE at the location of the UE.

In yet another embodiment, a non-transitory computer readable medium comprising program code is provided. The computer program includes computer readable program code that when executed causes at least one processor to receive, from a UE via a first wireless communication channel, WiFi signals that include information indicating a location of the UE. The WiFi signals are received by a transceiver of the electronic device. The transceiver includes a first antenna array for communication with the UE, and a second antenna array for communication with a base station. The computer readable program code causes the processor to transmit, to the base station via the second antenna array, uplink data and control information that includes the UE location information. The computer readable program code causes the processor to receive, from the base station via the second antenna array, downlink information intended for the UE. The computer readable program code causes the processor to forward-transmit, to the UE via a second wireless communication channel, the downlink information via a beam formed at the first antenna array to serve the UE at the location of the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
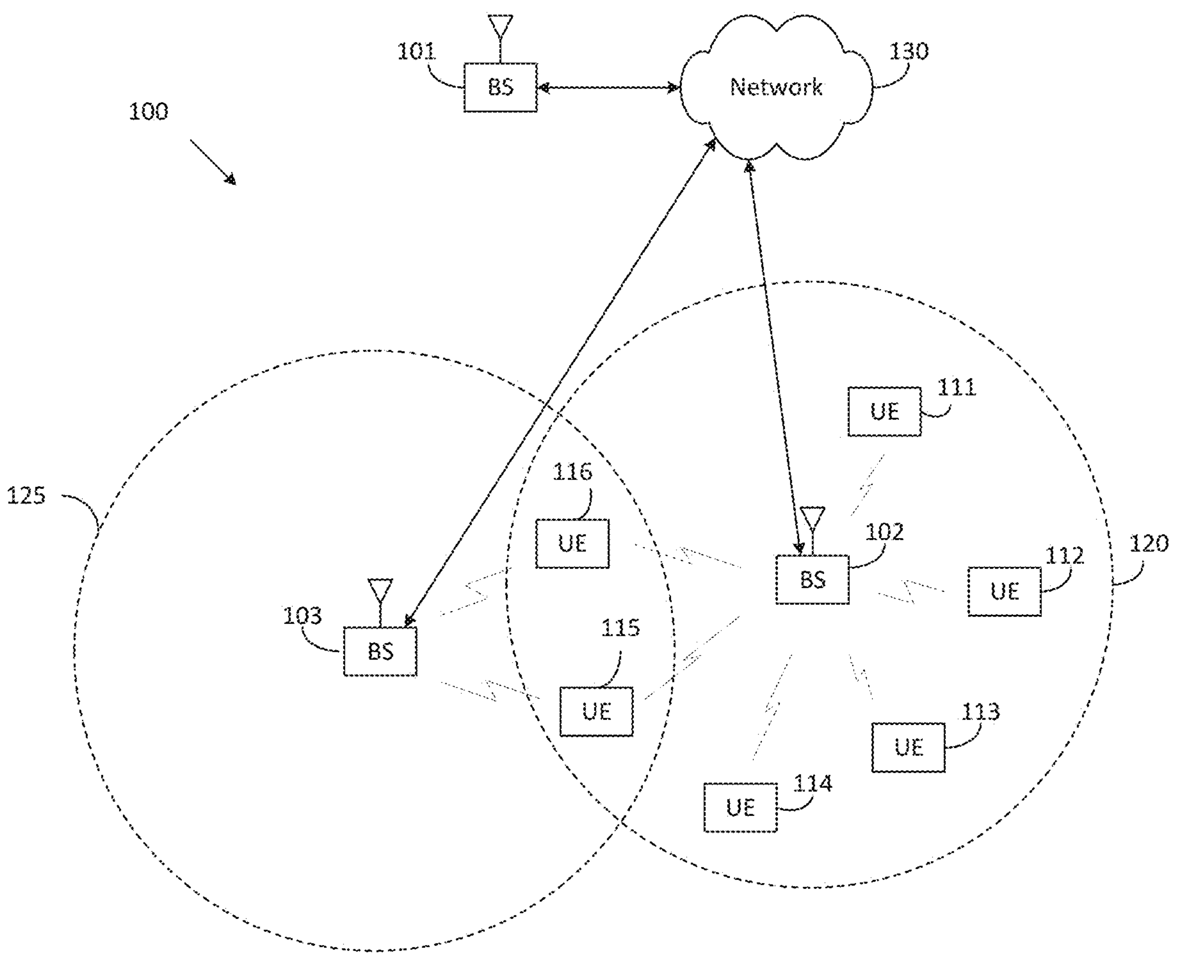
FIG. 1 illustrates an example wireless network according to this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

At high frequencies associated with new spectra (for example, mmWave, sub-THz, and THz bands), communication is only stable and efficient over a limited range due to the problems of strong path-loss and attenuation. One solution to overcome these strong path-loss and attenuation problems includes introducing reconfigurable intelligent surfaces (RISs) composed of passive components that assist in improving the coverage. However, RISs are not a fully matured technology especially for large scale implementation.

This disclosure provides another solution, namely, network controlled repeaters (also referred to as smart repeaters) that extend the coverage provided by base stations in both indoors and outdoors environments. Smart repeaters can also be regarded as low-cost solutions that can be easily deployed. Smart repeaters include The functionality of conventional RF repeaters with amplify and forward capabilities, but additionally, smart repeaters are composed of two or more beamforming antenna arrays. In the smart repeater, some antenna arrays can be oriented towards the base station, and the other antenna arrays can be directed towards the service area (such as toward the location of mobile devices, laptops, user equipment, televisions, etc.). These antennas of the smart repeater can be phased antenna arrays and can provide beamforming capabilities.

A smart repeater makes use of some information from the control signal to improve the amplify and forward operation in a time-division duplex system. The use of smart repeaters with integrated access and backhaul networks result in an improved overall radio access network deployment cost since there is no longer a need for cell densification. In indoor settings, information from the user equipment (UE) can also be transmitted over Wi-Fi signals.

This disclosure includes embodiments directed to integrating smart repeaters and wi-fi routers together to create a SmarterFi-Gateway. This disclosure includes embodiments directed to deploying the SmarterFi-Gateway technology in an indoor setting (for example, an airport terminal building, shopping mall, indoor stadium, etc.). Embodiments of this disclosure improves the smart repeater's beamforming capability because the user device information such as location, needed resources, and the like are sent to the gNodeB through the SmarterFi-Gateway technology.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

Figure 2:
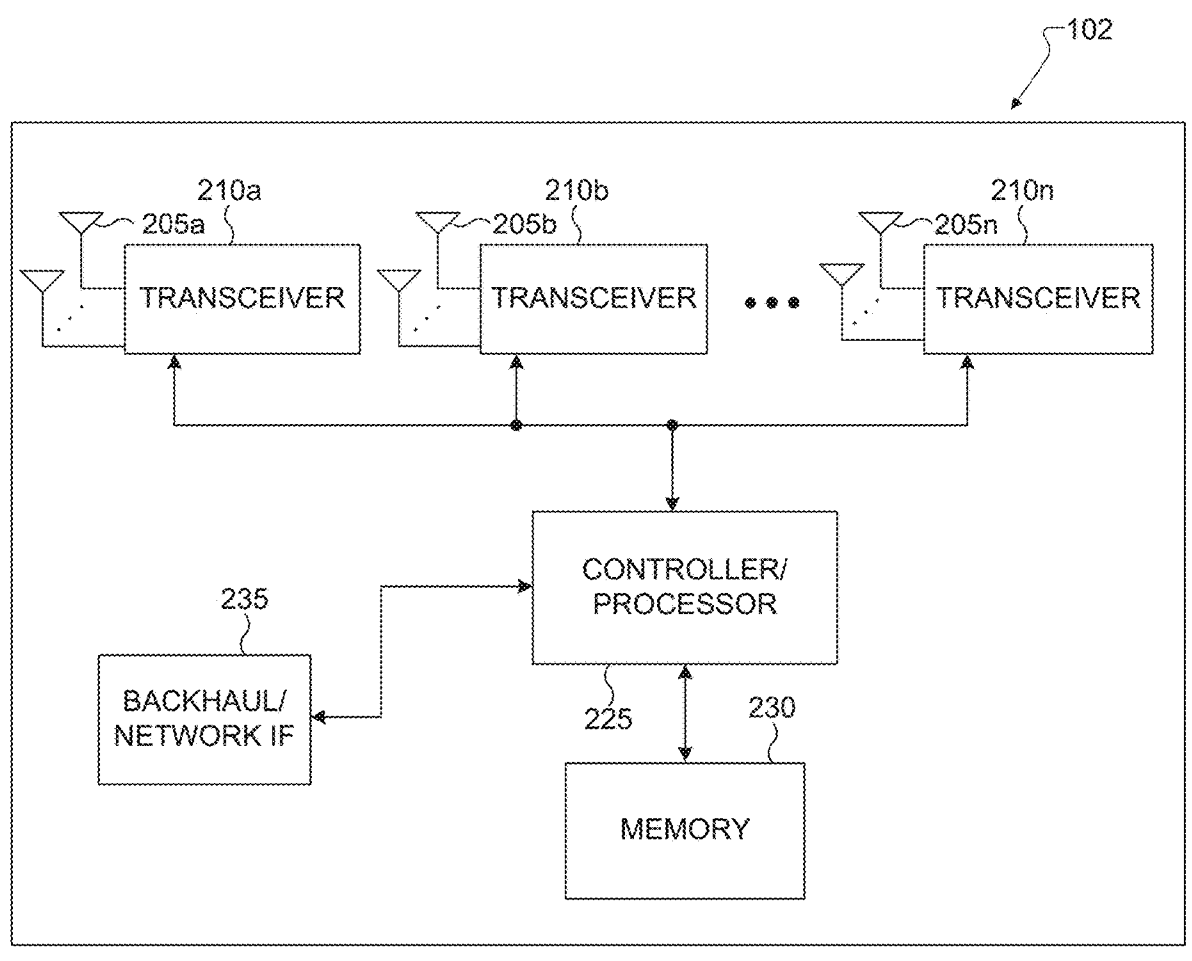
FIG. 2 illustrates an example gNodeB (gNB) according to this disclosure.
Figure 3:
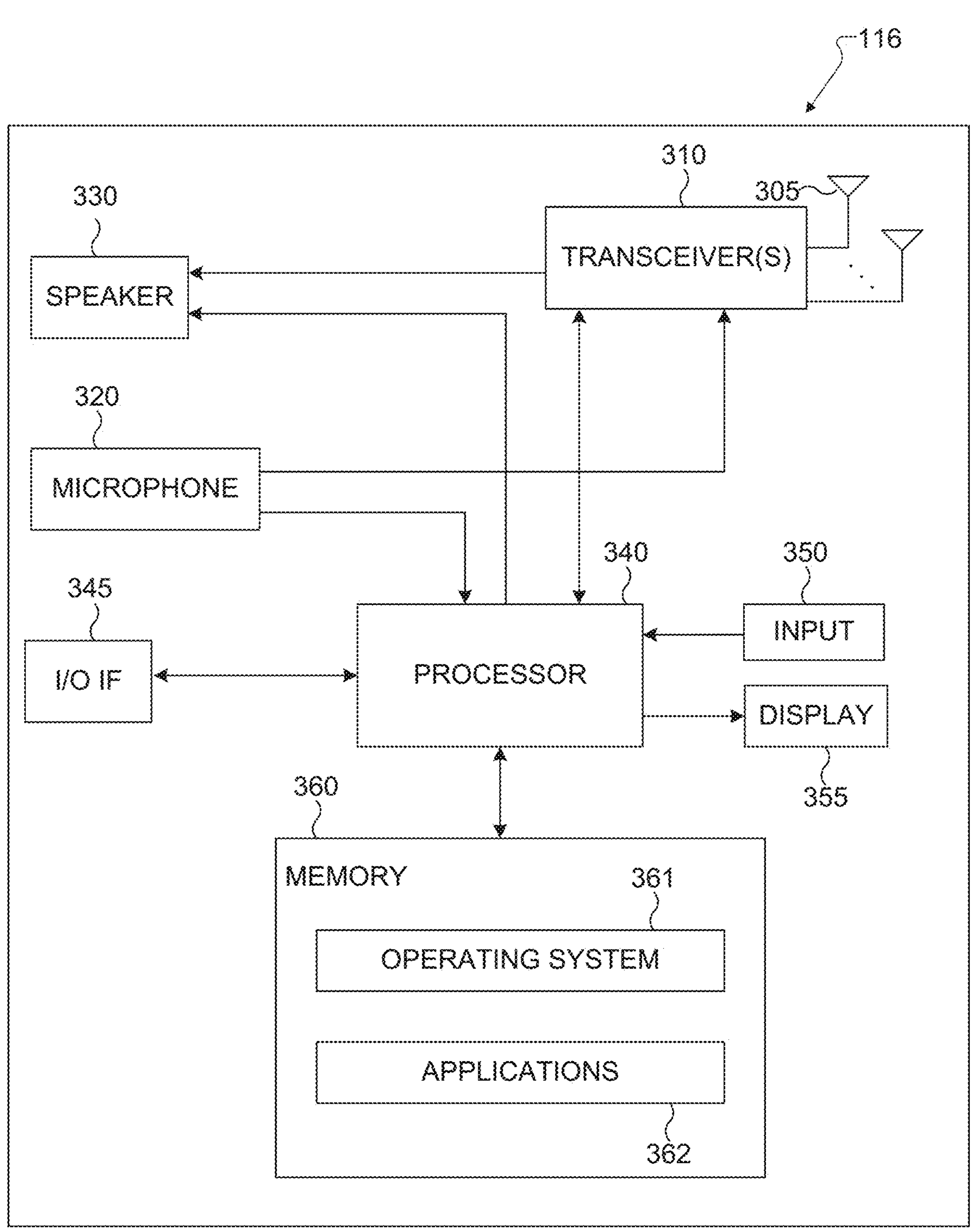
FIG. 3 illustrates an example user equipment (UE) according to this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, embodiments of this disclosure implement a SmarterFi-Gateway technology in an electronic device that integrates a WiFi access point with a smart repeater, and this SmarterFi-Gateway technology is performed by one or more components within the wireless network 100.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-convert the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

As described in more detail below, embodiments of this disclosure implement a SmarterFi-Gateway technology in an electronic device that integrates a WiFi access point with a smart repeater, and this SmarterFi-Gateway technology enhances the service in an indoor environment in the coverage area of the gNB 102.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

As described in more detail below, embodiments of this disclosure implement a SmarterFi-Gateway technology in an electronic device that integrates a WiFi access point with a smart repeater, and this SmarterFi-Gateway technology enhances the service at the location of the UE 116 in an indoor environment.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
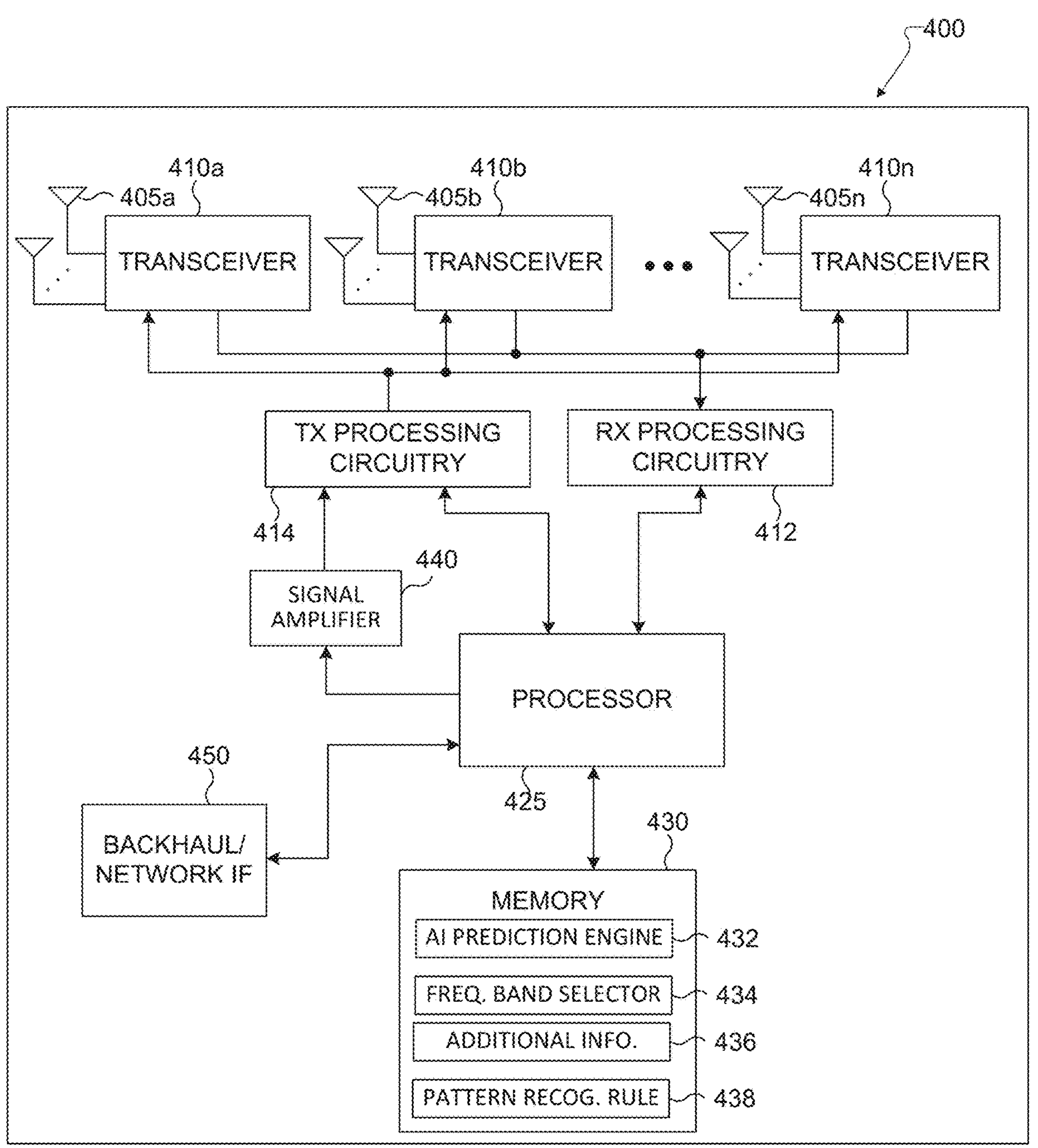
FIG. 4 illustrates an example SmarterFi Gateway (GW) according to this disclosure.

FIG. 4 illustrates an example SmarterFi gateway (GW) 400 according to this disclosure. The GW 400 is an electronic device in which a WiFi access point is integrated with a smart repeater (SR), which includes adaptive beamforming capabilities. The embodiment of the GW 400 shown in FIG. 4 is for illustration only, and other embodiments could be used without departing from the scope of this disclosure. The installation location of the GW 400 is determined according to a positioning based system design for SmarterFi GWs, in accordance with embodiments of this disclosure. The installation location of the GW 400 is a physical place where the GW 400 is located and a particular position how the GW 400 is oriented.

The GW 400 provides a solutions to several technical problems that occur in higher frequencies (e.g., higher than sub-6 GHz frequencies; or mmWave frequency bands) uplink and downlink communications between the gNB 102 and one or more UEs 111-116 of FIG. 1. One of these problems is that at mmWave frequencies, signals suffer from severe attenuation due to link blockage. The link blockage is caused by obstacles such as buildings, walls, cars, human beings, trees, etc. One other example problem is that signals have higher sensitivity to free space path loss at mmWave frequencies, and such path loss results in weak signals. Some other problems include poor (very weak) outdoor-to-indoor signal penetration at mmWave frequencies due to obstacles and due to the small wavelength of the mmWave signals, the roughness and imperfections of the surfaces of the obstacles result in a scattering effect that leads to a weaker signal strength. Other problems include a coverage limited setting (e.g., indoor setting where UEs are located) that users perceive as limited (reduced or weak) signal reception; area constraints on the array design; or difficulty to redirect the signal internally such that a maintained signal strength is achieved. Another problem is that a conventional repeater, which does not have adaptive beamforming capabilities, simply amplifies and forwards a signal received, which includes amplifying the noise received. The conventional repeater, being a full-duplex node, does not differentiate between uplink and downlink. A specific problem that embodiments of this disclosure solves is optimizing the use of SmarterFi GWs at mmWave frequencies to provide adaptive beamforming capabilities for improved indoor service area coverage.

An expensive potential solution to address poor outdoor-to-indoor coverage is to deploy more base station towers near each other outside the building, expecting that a beam formed by an outdoor gNB will reach an indoor UE and maintain signal strength and quality. However, 5G data rates might not be maintained in the absence of multi-node base station deployment, because beam training sessions can become complex and too slow. Also, deploying more base station towers does not overcome the problem of obstacles, such as building walls.

The GW 400 of this disclosure overcomes the above-described problems. The GW 400 of this disclosure not only includes repeater capabilities, but also includes adaptive beamforming capabilities using the SmarterFi Gateway technology and incorporates WiFi access point (e.g., WiFi router) capabilities. The creation of the GW 400 is a creation of a new modem that performs both functionalities, smart repeater functionalities (including adaptive beamforming capabilities) and WiFi access point functionalities. Through this SmarterFi Gateway technology, the UEs in the service area (e.g., coverage area 120 of FIG. 1) send information directly to the SmarterFi-Gateway technology over Wi-Fi signals, and such information indicates the location of the UE. The SmarterFi GW 400 relays this UE location information to the gNB 102 over cellular frequencies (such as 5G radio frequencies). The GW 400 tracks the position or location of one or more UEs, and within the GW 400, adaptive beamforming capabilities make use of the prior knowledge of the UE's position or location. The GW 400 reduces signal processing overhead because the UE 116 finds the position of the UE and seamlessly transmits the UE's position to the GW 400 over WiFi. The installation location of the GW 400 can be indoors, which can be a cheaper and simpler option than deploying more base station towers that are expensive. The SmarterFi GWs according to this disclosure, such as GW 400, are considered low cost, and are easily deployed. Additional details of the GW 400 are described further below.

As shown in FIG. 4, the GW 400 includes multiple antennas 405*a*-405*n*, multiple transceivers 410*a*-410*n*, a processor 425, a memory 430, and a signal amplifier 440 to amplify received signals for retransmission to UEs. The transceivers 410*a*-410*n* receive, from the antennas 405*a*-405*n*, incoming RF signals, such as signals transmitted by gNBs in the network 100. The transceivers 410*a*-410*n* down-convert the incoming RF signals to generate IF or baseband signals. The IF or baseband signals are processed by receive (RX) processing circuitry 412 in the transceivers 410*a*-410*n* and/or processor 425, which generates processed baseband signals by filtering, decoding, and/or digitizing the baseband or IF signals. The processor 425 may further process the baseband signals.

Transmit (TX) processing circuitry 414, which is in the transceivers 410*a*-410*n* and/or processor 425, receives analog or digital data (such as voice data, web data, e-mail, or interactive video game data) from the processor 425. The TX processing circuitry 414 encodes, multiplexes, and/or digitizes the outgoing baseband data to generate processed baseband or IF signals. The transceivers 410*a*-410*n* up-convert the baseband or IF signals to outgoing RF signals. The transceivers 410*a*-410*n* transmit, via the antennas 405*a*-405*n*, outgoing RF signals, such as signals intended for UEs in the network 100.

In some embodiments, one subset of the transceivers 410*a*-410*n* are configured for reception and transmission of WiFi signals, another subset of the transceivers 410*a*-410*n* are configured to receive signals from and to transmit signals to the gNB 102, and yet another subset of the transceivers 410*a*-410*n* are configured to transmit using adaptive beamforming. For ease of explanation, the first transceiver 410*a* will be described as a WiFi transceiver, representing each among the subset of the transceivers 410*a*-410*n* configured for reception and transmission of WiFi signals. The antenna (s) 405*a* of the WiFi transceiver will be described as a WiFi antenna or a WiFi antenna array. The WiFi transceiver and antennas (410*a* and 405*a*) enable the GW 400 incorporate functionality of an access point, such as a WiFi access point as described further below with FIG. 5. The antenna(s) 405*b* of the second transceiver 410*b* will be described as outdoor-facing antenna arrays configured to receive signals from and to transmit signals to the gNB 102. The antenna(s) 405*n* of the third transceiver 410*c* will be described as indoor-facing antenna arrays configured to transmit using adaptive beamforming to communicate signals to a UE 116.

In some embodiments, the GW 400 is configured with frequency switching capabilities. In such embodiments, a single multiple-band antenna array is configured with both the capabilities of an indoor-facing antenna array and the capabilities of a WiFi antenna. The multiple-band antenna array can be tuned different frequency bands. Particularly, the multiple-band antenna array can be tuned to a WiFi frequency band and can be switched to a cellular frequency band. The multiple-band antenna array can be controlled by a switch, such as the frequency band selector 434.

The processor 425 can include one or more processors or other processing devices that control the overall operation of the GW 400. For example, the processor 425 could control the reception of DL channel signals and the forward-transmission of those DL channel signals by the transceivers 410*a*-410*n*. As another example, the processor 425 could control the reception of UL channel signals and the forward-transmission of the UL channel signals by the transceivers 410*a*-410*n*. The processor 425 could support additional functions as well, such as more advanced wireless communication functions. For instance, the processor 425 could support beam forming or directional routing operations in which outgoing/incoming signals to/from multiple antennas 405*a*-405*n* are weighted differently to effectively steer the outgoing signals in a desired direction. Any of a wide variety of other functions could be supported in the GW 400 by the processor 425.

The processor 425 is also capable of executing programs and other processes resident in the memory 430, such as an OS. The processor 425 can move data into or out of the memory 430 as required by an executing process.

The memory 430 is coupled to the processor 425. Part of the memory 430 could include a RAM, and another part of the memory 430 could include a Flash memory or other ROM. In accordance with embodiments of this disclosure, the memory 430 can include a prediction engine 432 (such as an Artificial Intelligence (AI) prediction engine (PE)). In some embodiments, the memory 430 additionally includes a frequency band selector 434 that selects one operating mode of the multiple-band antenna array from among a WiFi mode and a cellular mode. In some embodiments, the memory 430 stores additional information 436 that the prediction engine 432 collected over time, such as during a pre-determined training period. In some embodiments, the memory 430 stores one or more pattern recognition rules 438.

The GW 400 provides adaptive beamforming capabilities when the location of the UE is known. One function of the GW 400 is obtaining the location of a UE. Finding the location of the UE requires positioning or localization technologies, such as through the use of GPS with GNSS repeaters or through the use of radar chirp transmission, ultrasound, Bluetooth, or RFID technology. Other positioning or localization technologies can be used without departing from the scope of this disclosure. The GW 400 obtains the location of a UE is by receiving WiFi signals that include information indicating a location of the UE (referred to as "UE location information"), and these WiFi signals are received from the UE.

As soon as this UE location information is received by the GW 400, the predictive engine 432 is used to select the proper beam and translate the location of the UE to a beam index. As a result, the GW 400 identifies the traffic transmitted via a wireless communication channel and directs the selected beam in the proper direction at a certain time to achieve adaptive beamforming capabilities. That is, the GW 400 with the predictive engine 432 performs selection of a proper beam to enhance the coverage and system performance.

In some embodiments, the GW 400 also includes backhaul or network interface 450 that is coupled to the processor 425. The backhaul or network interface 450 allows the GW 400 to communicate with other devices or systems over a backhaul connection or over a network. The interface 450 could support communications over any suitable wired or wireless connection(s). For example, the interface 450 could allow the GW 400 to communicate over a wired or wireless local area network or over a wired or wireless connection to a larger network (such as the Internet). The interface 450 includes any suitable structure supporting communications over a wired or wireless connection, such as an Ethernet or RF transceiver.

Although FIG. 4 illustrates one example SmarterFi GW 400, various changes may be made to FIG. 4. For example, various components in FIG. 4 could be combined, further subdivided, or omitted and additional components could be added according to particular needs. As a particular example, the processor 425 could be divided into multiple processors, such as one or more central processing units (CPUs). In another example, the transceiver(s) 410 may include any number of transceivers and signal processing chains and may be connected to any number of antennas. In another example, the prediction engine 432 is a SmarterFi gateway-based prediction engine that enables the GW 400 to upload data to a server that includes a server-based prediction engine. The server-based prediction engine executes the above-described functions of the prediction engine 432 to process the uploaded data, and that returns results from processing the uploaded data back to the SmarterFi gateway-based prediction engine, for example, by pushing the results to the prediction engine 432.

Figure 5:
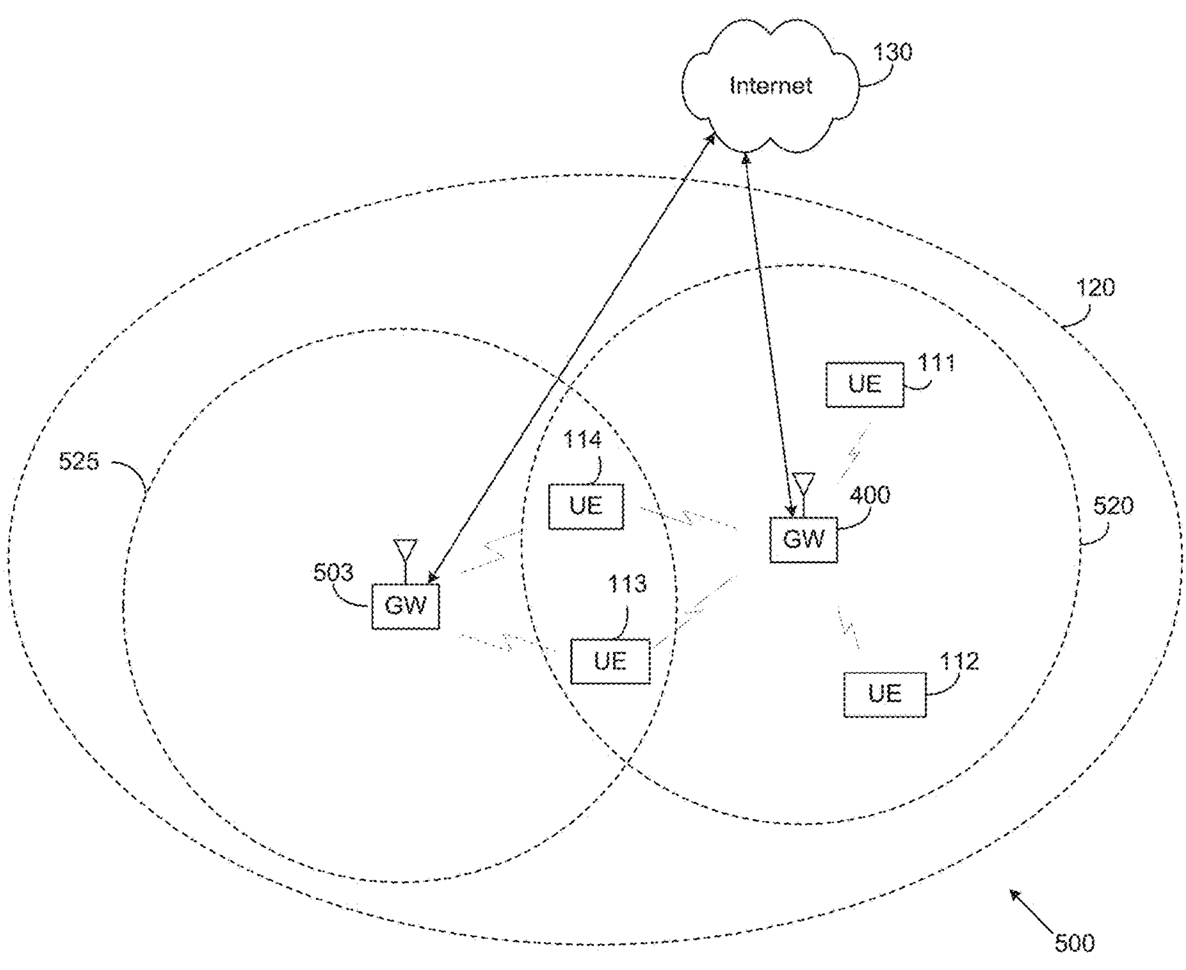
FIG. 5 illustrates an example wireless local area network (WLAN) according to various embodiments of the present disclosure.

FIG. 5 illustrates an example wireless local area network (WLAN) 500 according to various embodiments of the present disclosure. The embodiment of the WLAN 500 shown in FIG. 5 is for illustration only. Other embodiments of the WLAN 500 could be used without departing from the scope of this disclosure.

The WLAN 500 includes the GW 400 of FIG. 4 implementing the functionality of an access points (e.g., WLAN or WiFi access points). The GW 400 provides wireless access to the network 130 for a plurality of UEs 111-114 within a coverage area 520 of the GW 400. In some embodiments, the installation location of the GW 400 is in same building as the installation location of another SmarterFi GW 503, which includes the same components and functions of the GW 400 of FIG. 4. The coverage area 525 of the other SmarterFi GW 503 can partially overlap the coverage area 520 of the GW 400. The coverage area 120 of the gNB 102 of FIG. 1 includes (such as overlaps with) the coverage areas 520 and 525 of the SmarterFi GWs 400 and 503. The GWs 400 and 503 communicate with the network 130. The GWs 400 and 503 may communicate with each other and with the UEs 111-114 using WiFi or other WLAN communication techniques.

Depending on the network type, other well-known terms may be used instead of "access point" or "AP," such as "router" or "gateway" or "GW." For the sake of convenience, the terms "AP" and "GW" is used in this disclosure to refer to network infrastructure components that provide wireless access to remote terminals. In WLAN, given that the GW also contends for the wireless channel, the GW may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the term "UE" is used in this disclosure to refer to remote wireless equipment that wirelessly accesses an AP or contends for a wireless channel in a WLAN, whether the UE is a mobile device (such as a mobile telephone or smartphone) or is normally considered a stationary device (such as a desktop computer, AP, media player, stationary sensor, television, etc.).

Dotted lines show the approximate extents of the coverage areas 520 and 525, which are shown as approximately circular for the purposes of illustration and explanation only. It should be clearly understood that the coverage areas associated with GWs, such as the coverage areas 520 and 525, may have other shapes, including irregular shapes, depending upon the configuration of the GWs and variations in the radio environment associated with natural and man-made obstructions.

Although FIG. 5 illustrates one example of a WLAN 500, various changes may be made to FIG. 5. For example, the WLAN 500 could include any number of SmarterFi GWs and any number of UEs in any suitable arrangement. Also, the GW 400 could communicate directly with any number of UEs and provide those UEs with wireless broadband access to the network 130. Similarly, each SmarterFi GW 400 and 503 could communicate directly with the network 130 and provide UEs with direct wireless broadband access to the network 130. Further, the SmarterFi GWs 400 and/or 503 could provide access to other or additional external networks, such as external telephone networks or other types of data networks.

Figure 6:
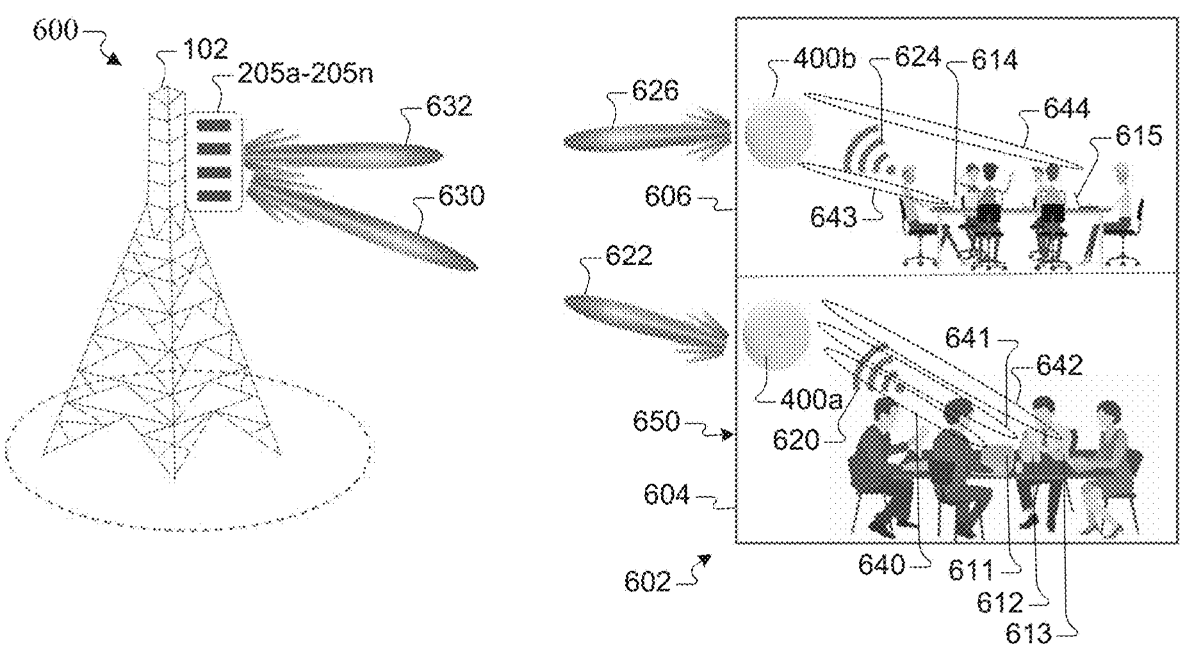
FIG. 6 illustrates an example scenario of a SmarterFi GW utilizing adaptive beamforming to aid wireless communication between a gNB and a UE in an indoor environment, according to this disclosure.

FIG. 6 illustrates an example scenario 600 of a SmarterFi GW utilizing adaptive beamforming to aid wireless communication between a gNB and a UE in an indoor environment, according to this disclosure. The embodiment of the scenario 600 shown in FIG. 6 is for illustration only, and other embodiments could be used without departing from the scope of this disclosure.

To avoid duplicative descriptions, some of the features (e.g., gNB 102, multiple antennas 205*a*-205*n* and coverage area 120) of the wireless network 100 of FIG. 1 and SmarterFi GW 400 of FIG. 4 are also included in the scenario 600 of FIG. 6. In this scenario 600, a building 602 is located inside the coverage area 120 of the gNB 102. The building 602 includes floors, exterior walls, interior walls, and a roof. The building 602 includes multiple levels (e.g., stories), and each level can include one or more rooms. For example, the first level 604 of the building 602 can be at ground level, including a first room. A second level 606 of the building 602 can be an upper level above the first level, including a second room.

Multiple UEs 611-615 are located in an indoors environment that the building 602 provides, and each of the UEs 611-615 of FIG. 6 can be the same as or represent the UEs 111-116 of FIG. 1. For example, a first UE 611 can be a laptop computer located at an end of a conference room table in a room on the first level 604. A second UE 612 can be a tablet computer, and a third UE 614 can be another laptop computer. The second and third UEs 612 and 614 are located at opposite sides of the conference room table in the room on the first level 604. Fifth and sixth UEs 614 and 615 can be laptop computer that are located at opposite ends of another conference room table in a room on the second level 606.

In this disclosure, areas of the building are referred to as being "indoors," for simplicity, but embodiments of this disclosure are not limited to operating indoors, and can operate in outdoor areas of the building where non-LoS conditions exist relative to the gNB 102. For example, non-LoS conditions exist at a covered patio area under the roof of the building 602, or at an unroofed courtyard area that is surrounded by exterior walls of the building blocking the LoS of the gNB 102.

The first UE 611 determines the location of the first UE 611, for example, by using positioning or localization technologies. The first UE 611 transmits one or more WiFi signals 620 including information indicating the location of the first UE 611. The first SmarterFi GW 400*a* receives the WiFi signals 620 transmitted from the first UE 611, obtains the UE location information indicating the location of the first UE 611, and transmits the UE location information to the gNB 102. In some embodiments, gNB 102 obtains the UE location information indicating the location of the first UE 611 via a first uplink beam 622 formed by the first GW 400*a*. In a similar manner the locations of the other UEs 612-615 obtained by and re-transmitted from the SmarterFi GWs 400*a*-400*b*. The other UEs 612-615 utilize positioning or localization technologies to determine their own locations, respectively. For ease of illustration, the WiFi signals 620 represents the one or more WiFi signals including information indicating the respective locations of the second and third UEs 612-613 that are located on the first level 604. The WiFi signals 624 represents the one or more WiFi signals that include information indicating the respective locations of the fourth and fifth UEs 614-615 located on the second level 606. The UE location information indicating the locations of the fourth and fifth UEs 614-615 is received by the second SmarterFi GW 400*b* via the WiFi signals 624, and re-transmitted from second SmarterFi GW 400*b* to the gNB 102 via a second uplink beam 626.

The gNB 102 transmits a first downlink beam 630 to communicate with the UEs 611-613 inside the first level 604 of the building 502, and transmits a second downlink beam 632 to communicate with the UEs 614-615 inside the second level 606 of the building 502. UEs 611-615 might not detect the signals contained within the DL beams 630-632, which suffer from severe attenuation due to link blockage caused by the walls (e.g., exterior wall 650) of the building 602. According to embodiments of this disclosure, the DL beams 630-632 easily reach the location of the outdoor-facing antenna arrays of the GWs 400*a*-400*b*, which are strongly detect the DL beams 630-632.

In this example, the first and second GWs 400*a*-400*b* are mounted to a wall located on the first level 604 and the second level 606 of the building 602, respectively, but could be located at any other suitable location of the building 602 to receive the beams 630-632 transmitted from the gNB 102. The first GW 400*a* receives the first DL beam 630, and the second GW 400*b* receives the second DL beam 632. The GWs 400*a*-400*b* can amplify the signal received via the DL beams 630-632 and can forward-transmit the amplified signal via adaptive beams 640-644 formed using adaptive beamforming. Each of the GWs 400*a*-400*b* has capabilities to identify that the signal received via the DL beams 630-632 contains traffic intended for a particular UE among the UEs 611-615. For example, if the first DL beam 630 contains traffic intended for the first UE 611, then the traffic will be received by the intended UE because the adaptive beam 640 extends far enough to reach the location of the first UE 611. Similarly, when the first DL beam 630 contains traffic intended for the second and third UEs 612-613, respectively, then the first GW 400*a* generates the second adaptive beam 641 to forward-transmit traffic the location of the second UE 612 and the generates the third adaptive beams 642 to transmit traffic to the location of the third UE 613. Similarly, when the second DL beam 632 contains traffic intended for the fourth and fifth UEs 614-615, respectively, then the second GW 400*b* generates the fourth and fifth adaptive beams 643-644 to extend to the locations of the fourth and fifth UEs 614-615, respectively. In this scenarios 600, each of the adaptive beams 640-644 is narrow compared to an omnidirectional beam or a semicircular beam. The adaptive beams 540-544 provided by the GWs 400*a*-400*b* enable the UEs to receive a better quality signal and a more stable communication link with the gNB 102.

Figure 7:
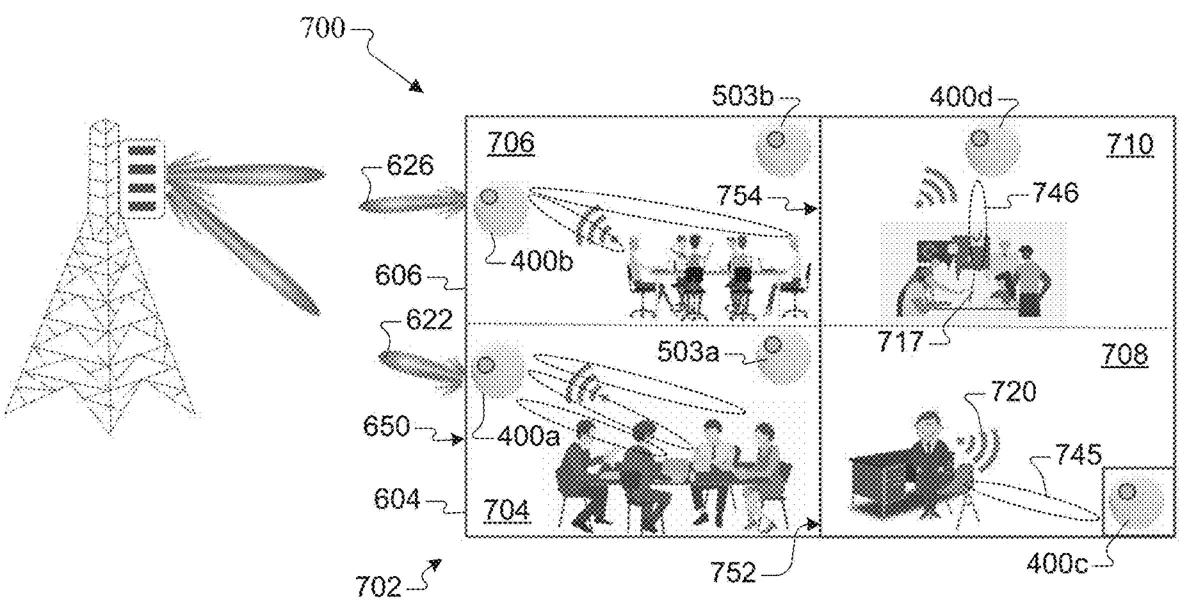
FIG. 7 illustrates an example layout of a building with an optimized number of SmarterFi GW installed inside the building, according to this disclosure.

Although FIG. 6 illustrates an example of a scenario 600, various changes may be made to FIG. 6. For example, various components in FIG. 6 could be combined, further subdivided, or omitted and additional components could be added according to particular needs. As a particular example, first level 604 of the building 602 can include multiple rooms separated by interior walls, and the second level 606 of the building 602 can include multiple rooms separated by interior walls, as shown in FIG. 7. As another particular example, the WiFi signals 620 and 624 are illustrated as being transmitting from the UEs to the SmarterFi GW 400*a*, but the WiFi signals 620 and 624 can also represent WiFi signals that the GWs 400*a* and 400*b* transmit, such as beacons broadcasted, or other types of WiFi signals transmitted to a particular UE.

FIG. 7 illustrates an example layout 700 of a building 702 with an optimized number of SmarterFi GWs installed inside the building, according to this disclosure. The embodiment of the layout 700 shown in FIG. 7 is for illustration only, and other embodiments could be used without departing from the scope of this disclosure.

To avoid duplicative descriptions, some of the features (e.g., gNB 102, and coverage area 120) of the wireless network 100 of FIG. 1 and GW 400 of FIG. 4 are also included in the layout 700 of FIG. 7. The building 702 is located inside the coverage area 120 of the gNB 102. The building 702 in FIG. 7 can be the same as or similar to the building 602 in FIG. 6 and includes the first and second levels 604 and 606 and exterior wall 650 of FIG. 6. Multiple UEs 611-615 that are located inside an indoors environment that the building 702 provides can be the same as or represent the UEs 111-116 of FIG. 1, or the UEs 611-616 of FIG. 6. Additionally, the layout 700 of FIG. 7 includes the WiFi signals 620 and 624, the adaptive beams 640-644, and the uplink beams 622 and 626 of FIG. 6.

The layout 700 of the building 702 includes multiple rooms, including a first room 704 on the first level 604, a second room 706 on the second level 606 directly above the first room 704, a third room 708 on the first level 604 adjacent to the first room 704, and a fourth room 710 on the second level 606 directly above the third room 708 and adjacent to the second room 706. According to the layout 700, an optimized number of SmarterFi GWs are installed inside the building 702, including the first and second GWs 400*a* and 400*b* respectively installed in the first and second rooms 704 and 706, the third and fourth GWs 400*c* and 400*d* respectively installed in the third and fourth rooms 708 and 710, and the fifth and sixth other SmarterFi GWs 503*a* and 503*b* respectively installed in the first and second rooms 704 and 706.

According to the layout 700 of the first level 604, the first room 704 can be a conference room into which multiple people bring their own UEs, respectively. In the example shown, the fifth GW 503*a* is currently not outputting any adaptive beams. However, the fifth GW 503*a* can be activated to generate adaptive beams to communicate with the UEs 111-113 in the coverage area (for example, first room 704) of the first GW 400, in order to reduce overloading when the first GW 400 is congested or operated at operating limits. That is, one or more of the UEs 111-113 can be handed off between the first and fifth GWs 400*a* and 503*a*. For example, when the prediction engine 432 determines or predicts that the number of UEs in the first room 704 that are served by the gNB 102 is greater than the number of adaptive beams that the first GW 400*a* is capable of generating concurrently, the fifth GW 503*a* can be activated to generate adaptive beams directed to the location of at least one of the UEs 111-113 based on that determination. As another example, when prediction engine 432 determines or predicts that the throughput demanded by the UEs in the first room 704 exceeds the throughput limit of the first SmarterFi GW 400*a*, the fifth GW 503*a* can be activated to generate adaptive beams directed to the location of at least one of the UEs 611-613 based on that determination. Similarly, to prevent congestion in the coverage area (for example, second room 706) of the second GW 400*b*, one or more of the UEs 614-615 can be handed off between the second and sixth GWs 400*b* and 503*b*.

In the first room 704, the first SmarterFi GW 400*a* is mounted to an interior side of the external wall 650, and the fifth SmarterFi GW 503*a* is mounted to an interior wall 752 that separates the first and third rooms 704 and 708. The fifth SmarterFi GW 503*a* can be the same as or similar to the GW 503 of FIG. 5, and the coverage area of fifth GW 503*a* can overlap the coverage area of the first GW 400*a*. The fifth GW 503*a* is also able to use adaptive beamforming to forward-transmit traffic from the gNB 102 one or more among the first through third UEs 611-613. That is, the sixth GW 503*b* performs functions relative to the second GW 400*b* and UEs 614-615 that are analogous to the functions performed by the fifth GW 503*a* relative to the first GW 400*a* and UEs 611-613.

According to the layout 700 of the first level 604, the third room 708 can be an office where only one person (e.g., office worker) works usually (e.g., on repeated occasions on different days in the past). The WiFi signals 720, which include information indicating the location of the sixth UE, are transmitted from sixth UE to the third GW 400*c*. The third room 708 includes a third SmarterFi GW 400*c* that generates a sixth adaptive beam 745 directed toward the location of the top surface of the desk, which is the location where the office worker who works in the office usually places a sixth UE associated with (e.g., registered to or owned by) the office worker. The prediction engine 432 associated with the third GW 400*c* may determine that congestion has not occurred (or has not occurred repeatedly in a pattern over time) in the coverage area (for example, third room 708) of the third GW 400*c*, and based on this determination may recommend to not install another GW (such as a redundant GW 503) in the coverage area. In this example, the optimized number of SmarterFi GWs installed inside the third room 708 is one.

Similar to the third room 708, the optimized number of SmarterFi GWs installed inside the fourth room 710 is one. The fourth room 710 can be a conference meeting room that includes one UE, namely, the seventh UE 717, which is a computer with a large display screen. For example, the seventh UE 717 can be a smart board for a classroom, an electronic interactive whiteboard, or multi-user touchscreen for group collaboration. Other UEs that do not have cellular communication capabilities can be located in the fourth room, but are not served by the adaptive beam 746 transmitted by the fourth GW 400*d* to the location of the seventh UE 717.

Figure 8:
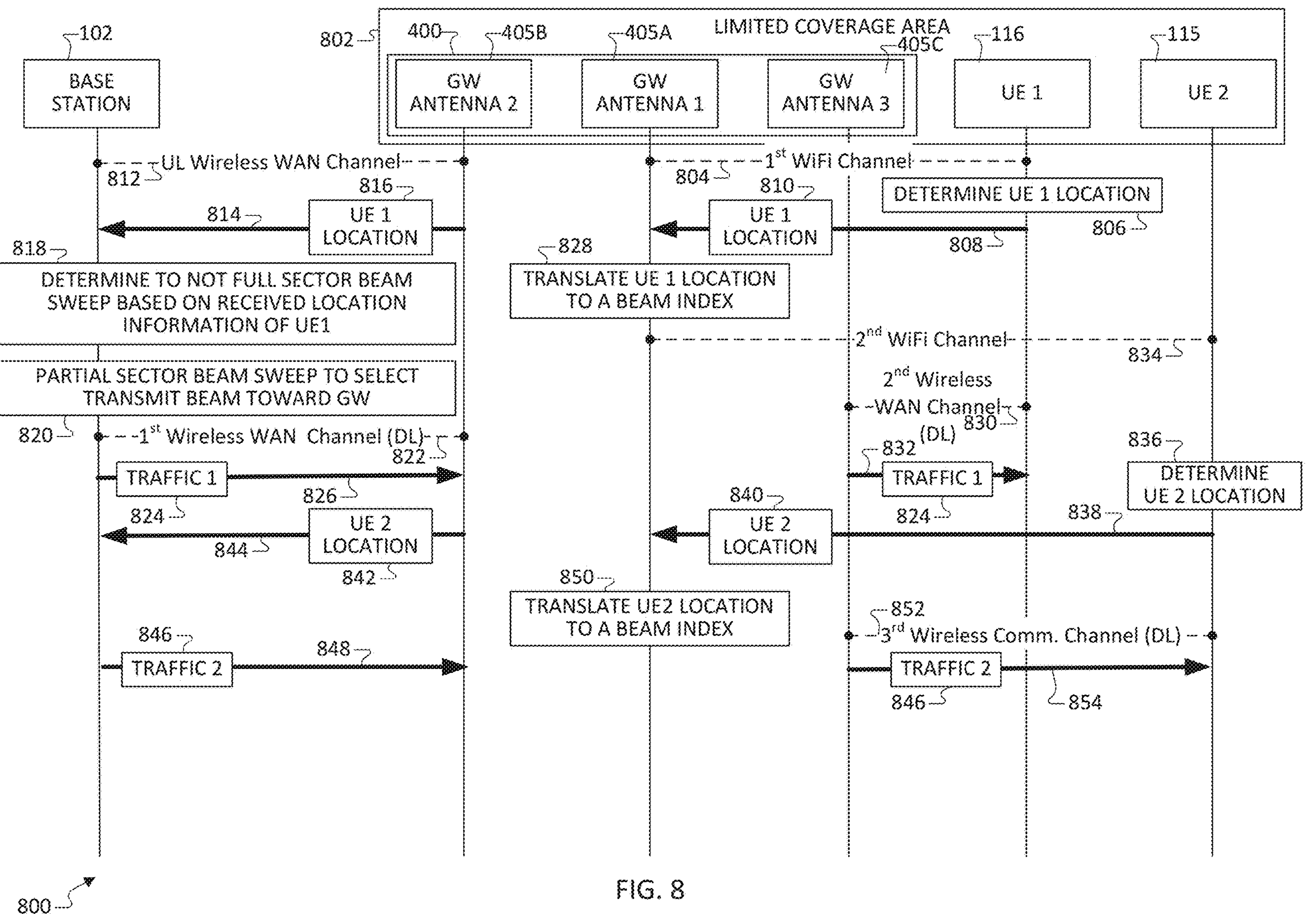
FIG. 8 illustrates a method of a SmarterFi GW utilizing UE location information to reduce a sector beam sweep and utilizing adaptive beamforming to aid wireless communication between a gNB and a UE in an indoor environment, according to this disclosure.

FIG. 8 illustrates a method 800 of a SmarterFi GW utilizing UE location information to reduce a sector beam sweep and utilizing adaptive beamforming to aid wireless communication between a gNB and a UE in an indoor environment, according to this disclosure. That is, the SmarterFi GW 400 utilizes the prediction engine 432 of FIG. 4. The embodiment of the method 800 shown in FIG. 8 is for illustration only. Other embodiments of the method 800 could be used without departing from the scope of this disclosure. For example, the functions performed by the two antennas arrays (e.g., first and third antenna arrays 405*a* and 405*c*) of FIG. 8 could be performed by a single antenna array that utilizes frequency band switching, such as the GW antenna array 405*d* of FIG. 9.

To avoid duplicative descriptions, some of the features (e.g., gNB 102, coverage area 120, and UEs 115-116) of the wireless network 100 of FIG. 1 and SmarterFi GW 400 of FIG. 4 are also included in the method 800 of FIG. 8. The limited coverage area 802 shown in FIG. 8 can be the same as or similar to the indoors environment of the building 602 of FIG. 6 or the building 702 of FIG. 7.

In the method 800, a first antenna 405*a* enables the GW 400 to detect and receive WiFi signals via a first WiFi channel 804, and this first antenna 405*a* can be one or more WiFi antennas that are part of a WiFi transceiver (for example, first transceiver 410*a*). The WiFi signals can include control information, data, or both. For example, the WiFi antenna 405*a* is tuned to the WiFi frequency band of the first WiFi channel 804.

At block 806, the UE1 116 determines its own location by using positioning or localization technologies, such as GPS/GNSS, radar, ultrasound, Bluetooth, or RFID technology. The first UE1 116 transmits one or more WiFi signals 808 that include information 810 that indicates the location of the UE1 116. Using the first antenna 405*a*, the GW 400 receives the WiFi signals 808 via the first WiFi channel 804, and the processor 425 obtains (e.g., extracts) the UE location information 810. The WiFi signals 808 can be an example of the WiFi signals 620, 624 shown in FIG. 6.

In the method 800, a second antenna enables the GW 400 to communicate with the gNB 102 via an uplink wireless communication channel 812 (e.g., WAN channel), and this second antenna can be one or more outdoor-facing antenna arrays that are part of a second transceiver 410*b* configured to receive signals from and to transmit signals to the gNB 102. The second transceiver 410*b* is tuned to the cellular frequency band of the uplink wireless communication channel 812. The GW 400 sends an uplink signal 814 to the gNB 102, based on the UE location information 810. The uplink signal 814 includes information 816 that indicates the location of the UE1 116. In some embodiments, the information 816 is the same as the UE location information 810, simply retransmitted via the uplink wireless communication channel 812. In other embodiments, the GW 400 translates the UE location information 810 into the information 816 that indicates the location of the UE1 116 in a different format, for example, the information 816 can be associated with use of a subset of beams to reduce a sector beam sweep.

At block 818, the gNB 102 determines to not perform a full sector beams sweep based on the received information 816 that indicates the location of the UE1. More particularly, the information 816 informs the gNB 102 that the UE1 116 is located in the coverage area of the GW 400. From among a full set of beams that correspond to a full sector beam sweep, a subset of beams correspond to the coverage area of the GW 400. In response to receiving the information 816 from the GW 400, the gNB 102 can determine to skip sweeping the full set of beams, to skip forming a DL beam directed to the location of the UE1 116, and instead to reduce a sector beam sweep.

At block 820, the gNB 103 performs a partial sector beam sweep to select a transmit beam directed to the outdoor-facing antenna arrays of the second transceiver 410*b* of the GW 400. Particularly, this selected transmit beam can be referred to as the first downlink wireless communication channel 822 (e.g., WAN channel). The gNB 102 determines to communicate with the UE1 116 via a first downlink wireless communication channel 822. Data intended for the UE1 116 is referred to as traffic 824 (shown as "TRAFFIC 1"), which the is included in the downlink signals 826 transmitted via the first downlink wireless communication channel 822.

In the method 800, a third antenna 405*c* enables the GW 400 to communicate with one or more UEs 115-116, and this third antenna 405*c* can be one or more indoor-facing antenna arrays that are part of a transceiver (for example, a third transceiver 410*c*) configured to forward-transmit using adaptive beamforming to communicate signals to the UEs 115-116. At block 828, the processor 425 of the GW 400 translates the UE location information 810 to a beam index. This beam index corresponds to an adaptive beam formed at the third antenna array 405*c* to serve the UE1 116 at the location indicated by the information 810, namely, the location of the UE1. This adaptive beam can be referred to as the second downlink wireless communication channel 830 (e.g., WAN channel). The third antenna 405*c* is tuned to the cellular frequency band of the second downlink wireless communication channel 830.

The second antenna 405*b* of the GW 400 receives DL signals 826 containing the traffic 824. The processor 425 controls the GW 400 to forward-transmit the traffic 824 to the UE1 116 via the second DL wireless communication channel 830. The first adaptive beam 640 shown in FIG. 6 is an example of the DL signal 832 carrying the traffic 824 via the second DL wireless communication channel 830. In some embodiments, DL signal 832 carrying the traffic 824 via the second DL wireless communication channel 830 is amplified by the signal amplifier 440 such that the signal strength that the UE1 116 receives from the third antenna 405*c* is stronger than a signal that the gNB 102 would have transmitted directly to the UE1 116 without the intermediary GW 400. As a result, the adaptive beamforming capabilities of the GW 400 overcomes the problems associated with outdoor-to-indoor communications between the gNB 102 and the UE1 116.

The method 800 includes a scenario in which the GW 400 improves communications between the gNB 102 and multiple UEs concurrently. The first antenna 405*a* enables the GW 400 to detect and receive WiFi signals via a second WiFi channel 834.

At block 836, the UE2 115 determines its own location by using positioning or localization technologies. The procedure that the UE2 115 performs at block 836 can be the same as the procedure performed by UE1 116 at block 806. The UE2 115 transmits one or more WiFi signals 838 that include information 840 that indicates the location of the UE2 115.

Using the first antenna 405*a*, the GW 400 receives the WiFi signals 838 via the second WiFi channel 834. According to various embodiments is this disclosure, the first and second WiFi channels 804 and 834 share the same WiFi frequency band or can have WiFi frequencies different from each other.

The GW 400 sends information 842 that indicates the location of the UE2 116 to the gNB 102. In some embodiments, the information 842 is the same as the UE location information 840, simply retransmitted via the uplink wireless communication channel 812. In other embodiments, the GW 400 translates the UE location information 840 into the information 842 that indicates the location of the UE2 115 in a different format, for example, the information 842 can be associated with use of a subset of beams to reduce a sector beam sweep. The GW 400 uses the second antenna 405 to transmit an uplink signal 844 that includes the UE location information 842 that indicates the location of the UE2 115.

The information 842 informs the gNB 102 that the UE2 115 is located in the coverage area of the GW 400. The gNB 102 determines to communicate with the UE2 115 via the first downlink wireless communication channel 822, based on the information 842 received. Data intended for the UE2 115 is referred to as traffic 846 (shown as "TRAFFIC 2"), which the is included in the downlink signals 848 transmitted via the first downlink wireless communication channel 822.

At block 850, the processor 425 of the GW 400 translates the UE location information 8846 to a beam index. The procedure performed at block 850 with respect to the UE2 115 is analogous to the procedure performed at block 828 with respect to the UE 1 116. This beam index corresponds to a second adaptive beam formed at the third antenna array 405*c* to serve the UE2 116 at the location indicated by the information 842, namely, the location of the UE2. This second adaptive beam can be referred to as the third downlink wireless communication channel 852 (e.g., WAN channel). The third antenna 405*c* is tuned to the cellular frequency band of the third downlink wireless communication channel 852.

The second antenna 405*b* of the GW 400 receives DL signals 848 containing the second traffic 846. The processor 425 controls the GW 400 to forward-transmit the second traffic 846 to the UE2 115 via the third DL wireless communication channel 852. The second adaptive beam 641 shown in FIG. 6 is an example of the DL signal 854 carrying the traffic 846 via the third DL wireless communication channel 852. In some embodiments, DL signal 854 carrying the second traffic 846 is amplified by the signal amplifier 440. As a result, the adaptive beamforming capabilities of the GW 400 overcomes the problems associated with outdoor-to-indoor communications between the gNB 102 and the UE2 115.

Although FIG. 8 illustrates an example method 800 of a SmarterFi GW utilizing UE location information to reduce a sector beam sweep and utilizing adaptive beamforming to aid wireless communication between a gNB and a UE in an indoor environment, various changes may be made to FIG. 8. For example, while shown as a series of steps, various steps in FIG. 8 could overlap, occur in parallel, occur in a different order, or occur any number of times. As a particular example, multiple UEs can transmit WiFi signals indicating their respective locations simultaneously, as such, the transceiver associated with the first antennas 405*a* can implement MU-MIMO to receive the WiFi signals 808 and 838 simultaneously. Similarly, the transceiver associated with the indoor-facing third antennas 405*c* can maintain multiple wireless communication channels 830 and 852 concurrently, for example by forming multiple adaptive beams (640 and 641 of FIG. 6) concurrently to forward-transmit traffic 824 and 846 to multiple UEs 116 and 115, respectively.

As another example, in some embodiments of the method 800, the WiFi channel 804, 834 between the GW 400 and the UE 116, 115 could instead be an uplink wireless communication channel (e.g., WLAN channel). That is, the UE location information 810, 840 can be transmitted by the UE 116, 115 and received by the GW 400 at an antenna array (such as the third antenna 405*c* or a first antenna array) that is that is tuned to the cellular frequency band of the uplink wireless communication channel.

Figure 9:
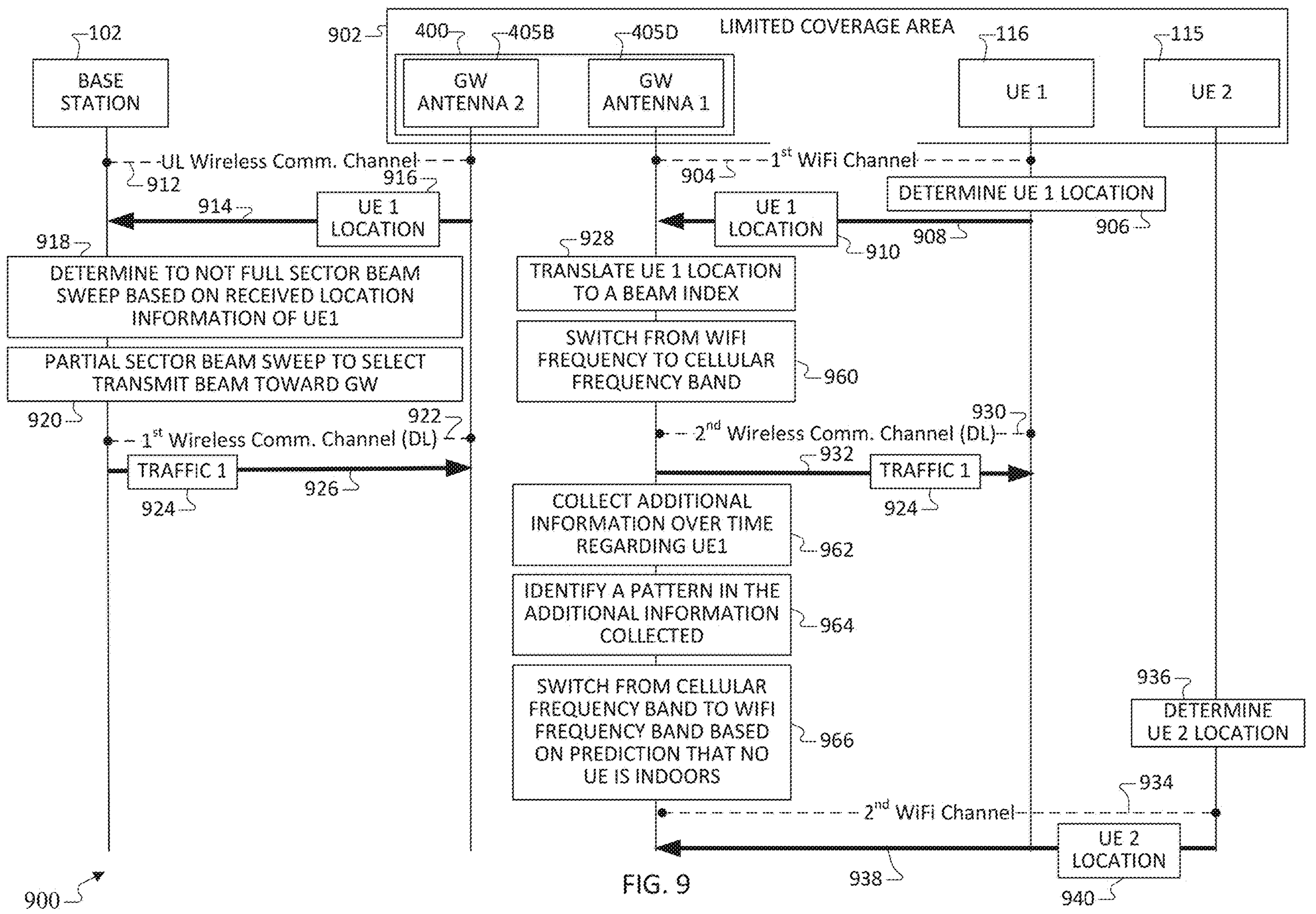
FIG. 9 illustrates a SmarterFi GW utilizing frequency band switching to operate in a WiFi mode or the cellular mode, according to this disclosure.

FIG. 9 illustrates a method 900 implemented by a SmarterFi GW 400 utilizing frequency band switching to operate in a WiFi mode or the cellular mode, according to this disclosure. That is, the SmarterFi GW 400 utilizes the frequency band selector 434 of FIG. 4. The embodiment of the SmarterFi GW 400 shown in FIG. 9 is for illustration only, and other embodiments could be used without departing from the scope of this disclosure.

To avoid duplicative descriptions, some of the features (e.g., gNB 102, coverage area 120, and UEs 115-116) of the wireless network 100 of FIG. 1 and SmarterFi GW 400 of FIG. 4 are also included in the method 900 of FIG. 9. The limited coverage area 902 shown in FIG. 9 can be the same as or similar to the indoors environment of the building 602 of FIG. 6 or the building 702 of FIG. 7. Some of the features 904-928 and 934-940 in the method 900 of FIG. 9 are the same as or similar to the corresponding features 804-828 and 934-840 of FIG. 8, respectively. The second downlink wireless communication channel 930 and the downlink signal 932 that carries the first traffic 924 to the UE1 116 are described more particularly below.

In the method 900, the GW 400 includes an indoor-facing antenna array 405*d* (also referred to as first antenna 405*d*) that enables the GW 400 to communicate with one or more UEs 115-116, the second antenna 405*b*, and the frequency band selector 434 of FIG. 4 that controls the operating frequency and operating mode of the first antenna 405*d*. The first antenna 405*d* can be part of a transceiver (for example, a transceiver 410*d*) configured to receive WiFi signals from the UEs 115-116 and configured to forward-transmit using adaptive beamforming to communicate cellular signals to the UEs 115-116 and. That is, first antenna 405*d* is designed for frequency-switching between a WiFi frequency band and a cellular frequency band. In order to receive the WiFi signals 908 from the UE1 116, the frequency band selector 434 tunes the first antenna 405*d* to the WiFi frequency band of the first WiFi channel 904. In order to transmit downlink signals 932 to the UE1 116, the frequency band selector 434 tunes the first antenna 405*d* to the cellular frequency band of the second downlink wireless communication channel 930.

At block 928, the processor 425 of the GW 400 translates the UE location information 910 to a beam index. This beam index corresponds to an adaptive beam formed at the indoor-facing antenna array 405*d* to serve the UE1 116 at the location indicated by the information 910, namely, the location of the UE1. This adaptive beam can be referred to as the second downlink wireless communication channel 930 (e.g., WAN channel). Once the UE location information 910 has been translated to the corresponding beam index, the GW 400 does not need WiFi signals to determine the location of the UE1 116, as the localization is already configured.

At block 960, the operating frequency of the indoor-facing antenna array 405*d* switches from the WiFi frequency band to the cellular frequency band. For example, the processor 425 selects one operating mode of the indoor-facing antenna array 405*d* from among the WiFi mode and the cellular mode. The selected operating mode determines the operating frequency of indoor-facing antenna array 405*d*. In some embodiments, the frequency band selector 434 is configured to select the cellular frequency band in response to transmitting the UE location information 910. That way, the first antenna 405*d* is already switched to the cellular mode when the first traffic 924 is received at the second antenna 405*b*, and the processor 425 can forward-transmit the first traffic via the DL signal 932 without waiting for the first antenna 405*d* to switch to the cellular mode. In some embodiments, the frequency band selector 434 is configured to select the cellular frequency band after transmitting the UE location information 910, for example, in response to receiving the first traffic 924 at the second antenna 405*b*.

At block 962, the GW 400 collects additional information over time. In some embodiments, the processor 425 executes the prediction engine 432 to collect the additional information over time (e.g., a pre-determined training period that can be a number of days, one month, or two months). For example, the additional information collected over time can include additional information regarding a specific UE. The specified UE can be one or more UEs from which the GW 400 has previously received UE location information 910, such as the UE1 116.

At block 964, the GW 400, using the prediction engine 432, identifies a pattern in the additional information collected. Once the pattern is identified, the prediction engine 432 may create a rule to identify an occurrence of the identified pattern, such as a pattern recognition rule 438 of FIG. 4.

A power-reduction scenario provides a particular implementation of blocks 962 and 964. To predict one or more times when no UE is present within a WiFi coverage area 520 (FIG. 5) of the first antenna 405*d*, the GW 400 collects (at block 962) additional information over time. The additional information collected includes but is not limited to one or more times when the GW 400 detects the presence of zero UEs within the WiFi coverage area 520. For example, when there are zero UEs transmitting any WiFi signal within the WiFi coverage area 520 of the first antenna 405*d*. When the WiFi coverage area 520 of the first antenna 405*d* covers the entirety of a three-dimension space (such as a building (e.g., 602 or 702), a level of a building (e.g., 604 or 606), or room (704, 706, 708, or 710)), then the prediction engine 432 can determine that 3D space is empty (meaning no UE is present) based on a determination that zero UEs are present in the WiFi coverage area 520. The additional information collected by prediction engine 432 may include data indicating a number of UEs present in the WiFi coverage area 520 at different times (e.g., periodically), or the data may include a time-stamped flag indicating whether or not the 3D space is empty.

In the power-reduction scenario, the GW 400 identifies (at block 962) one or more patterns in the additional information collected. For example, if an office building 602 is open only from 6:30 am until 6:30 pm each Monday through Friday, then the prediction engine 432 may identify a pattern observed during the pre-determined training period that the WiFi coverage area 520 was repeatedly empty from 6:30 pm on Friday until 6:30 am on Monday, and was empty nightly from 6:30 pm until 6:30 am on Monday through Thursday. During pre-determined training period, if the office building is closed on certain holidays during pre-determined training period, then the prediction engine 432 may identify a pattern that the WiFi coverage area 520 was repeatedly empty all hours on the first day of January of every year (i.e., New Years Day holiday) or other holiday that follows a pattern.

In the power-reduction scenario, the prediction engine 432 enables the processor 425 to identify an occurrence of the identified pattern, based on a determination that a current time corresponds to (e.g., matches) the one or more times when no UE is present within a WiFi coverage area 520 of the first antenna 405*d*. In other words, the prediction engine 432 enables the processor 425 predict that no UE is indoors in the building 602 during a predicted time (e.g., holidays, weekends, and times 6:30 pm until 6:30 am). That is the prediction engine 432 enables the processor 425 predict the WiFi coverage area 520 is empty based on a current time corresponding to (e.g., matching) the predicted times when the WiFi coverage area 520 was repeatedly empty.

At block 966, the operating frequency of the indoor-facing antenna array 405*d* switches from the cellular frequency band to the WiFi frequency band, based on a prediction that no UE is indoors during the predicted time. For example, in response to determining that the current time is included within a range of predicted times (e.g., holidays, weekends, and times 6:30 pm until 6:30 am), the processor 425 selects the WiFi mode as operating mode of the indoor-facing antenna array 405*d*.

The GW 400 consumes more computing resources and electrical energy when operating in the cellular mode and generating the adaptive beams, compared to when operating in the WiFi mode. Whenever the WiFi coverage area 520 contains zero UEs to be served by adaptive beams 640-641, the GW 400 can reduce consumption of computing resources and save energy by switching to the WiFi mode. As another way embodiments of this disclosure reduces consumption, the frequency band selector 434 is configured to periodically (e.g., every 5 or 15 minutes) switch to the WiFi frequency, enabling the GW 400 to check for incoming WiFi signals 938 carrying information 940 indicating the location of any new UEs are now present in the WiFi coverage area 520.

Although FIG. 9 illustrates an example method 900 implemented by the SmarterFi GW 400 utilizing frequency band switching to operate in a WiFi mode or the cellular mode, various changes may be made to FIG. 9. For example, while shown as a series of steps, various steps in FIG. 9 could overlap, occur in parallel, occur in a different order, or occur any number of times. As a particular example, the prediction engine 432 enables the GW 400 to make predictions about multiple UEs, and block 962-964 can be performed with respect to UE2 115 as well.

Figure 10:
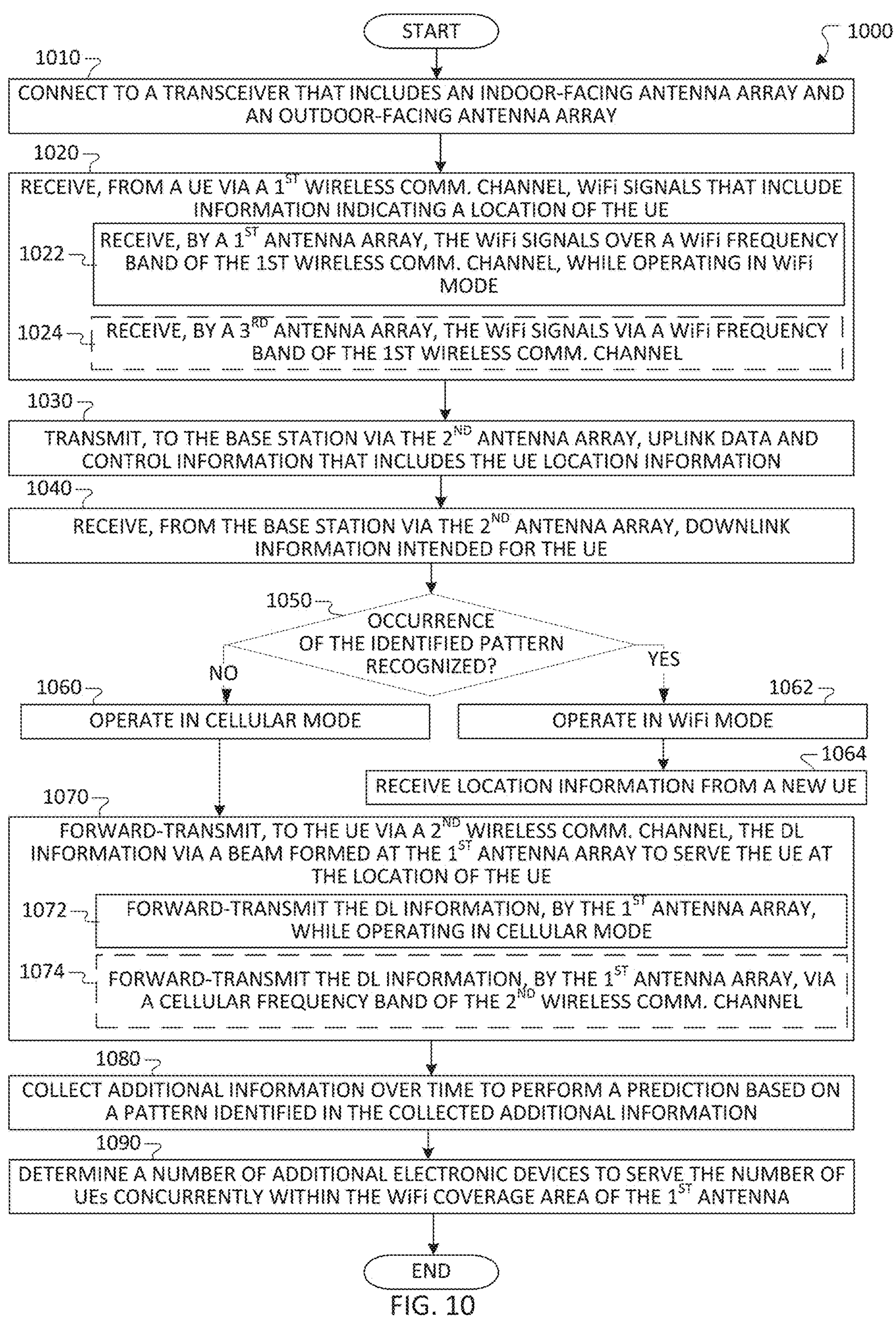
FIG. 10 illustrates a method for implementing a SmarterFi-Gateway technology in an electronic device that integrates a WiFi access point with a smart repeater, according to this disclosure.

FIG. 10 illustrates a method 1000 for implementing a SmarterFi-Gateway technology in an electronic device that integrates a WiFi access point with a smart repeater, according to this disclosure. The embodiment of the method 1000 shown in FIG. 10 is for illustration only, and other embodiments could be used without departing from the scope of this disclosure. The method 1000 is implemented by an electronic device, such as the SmarterFi GW 400 of FIG. 4. More particularly, the method 1000 could be performed by a processor 425 of the SmarterFi GW 400 executing the prediction engine 432 and/or the frequency band selector 434. For ease of explanation, the method 1000 is described as being performed by the processor 425.

At block 1010, the processor 425 connects to a transceiver. The transceiver includes a first antenna array for communication with a UE, and a second antenna array for communication with a base station. For example, the processor 425 is operably connected to one or more of the transceivers 4101-410*n*. The first antenna array, and can be the first antenna 405*a* of FIG. 8 or the first antenna 405*d* of FIG. 9. The first antenna array is an indoor-facing antenna array that enables the GW 400 to communicate with one or multiple UEs. For example, the first GW 400*a* is communicating with multiple UEs 611-613 as shown in FIG. 6, and the fourth GW 400*d* is communicating with one UE 717 as shown in FIG. 7. The first antenna is configured to operate in an indoor environment, such as inside of a building 602. In some embodiments, the second antenna array is configured to operate in an outdoor environment, such as on an exterior surface of an external wall or rooftop of the building 602.

At block 1020, the processor 425 receives from the UE via a first wireless communication channel, WiFi signals that include information indicating a location of the UE. As an example, in FIG. 8, the GW 400 receives the WiFi signals 808 and 838 that include information 810 and 840, respectively. In a frequency-switching embodiment of the GW 400, as shown in FIG. 9, the processor 425 receives the WiFi signals via the first wireless communication by performing the procedure of block 1022. In a different embodiment of the GW 400 without frequency-switching, the processor 425 receives the WiFi signals via the first wireless communication by performing the procedure of block 1024, as shown in FIG. 8.

Block 1022 relates to a frequency-switching embodiment of the GW 400 that includes the frequency band selector 434 and a first antenna array 405*d* that is a multiple-band antenna designed to achieve frequency band switching. At block 1022, the processor 425 receives the WiFi signals 908 over a WiFi frequency band of the first wireless communication channel 904, while operating in a WiFi mode. More particularly the first antenna array 405*d* is tuned to the WiFi frequency band and receives the WiFi signals 908 over the WiFi frequency band of the first wireless communication channel 904, while operating in a WiFi mode.

Block 1024 relates to embodiments of the GW 400 without frequency-switching, and the GW 400 includes a third antenna array 405*c* configured to receive the WiFi signals via a WiFi frequency band of the first wireless communication channel. At block 1024, the processor 425 receives, by the third antenna array 405*c*, the WiFi signals 808 via a WiFi frequency band of the first wireless communication channel 804.

At block 1030, the processor 425 transmits, to the base station via the second antenna array 405*b*, uplink data and control information that includes the UE location information. As an example, in FIG. 9, the UE location information 916 transmitted (within the signals 914) indicates the location of the UE 116 associated with use of a subset of beams to reduce a sector beam sweep. In the embodiment of the GW 400 without frequency-switching, the second antenna array is configured to transmit the uplink data and control information that includes the UE location information via a third wireless communication channel. In the frequency-switching embodiment of the GW 400, the processor 425 is configured to transmit, via a third wireless communication channel (e.g., the uplink WLAN channel 912 of FIG. 9) associated with the second antenna array 405*b*, the uplink data and control information that includes the UE location information 916. Also, in the frequency-switching embodiment of the GW 400, the processor 425 is further configured to switch the first antenna array 405*d* to operate in the WiFi mode or the cellular mode.

At block 1040, the processor 425 receives, from the base station via the second antenna array, downlink information intended for the UE. The method 1000 proceeds from block 1040 to block 1070 in some cases, such as when the prediction engine 432 has yet to identify a pattern in additional data collected over time. In other cases, such as when the prediction engine 432 has identified a pattern or has generated a rule 438 enabling the processor 425 to identify an occurrence of the identified pattern, the method 1000 proceeds from block 1040 to 1050.

At block 1050, if the processor 425 does not recognize an occurrence of an identified pattern in the additional data collected 436, then the GW 400 performs a function corresponding to no recognition (illustrated as the NO arrow). Alternatively, if the processor 425 recognizes an occurrence of an identified pattern in the additional data collected 436, then the GW 400 performs a function corresponding to the occurrence recognized (illustrated as the YES arrow). There are many different patterns that can be identified in the additional information collected. Each pattern can correspond to at least two alternative functions corresponding to the YES/NO recognition outcomes of block 1050.

As a particular example a pattern can be identified to reduce consumption of computing resources and save energy, in which case, the GW 400 can determine that a current time corresponds to one or more times when no UE is present within a WiFi coverage area 520 of the first antenna 405*a* or 405*d*. The processor 425 can recognize, via the prediction engine 432, an occurrence of the identified pattern, based on the determination that the current time corresponds to the one or more times when no UE is present within the WiFi coverage area 520 of the first antenna. In this example, the frequency band selector 434 can select different operating modes (e.g., blocks 1060 or 1062) based on whether or not an occurrence of the identified pattern is recognized.

At block 1060, GW 400 operates in the cellular mode based on a determination that no occurrence of the identified pattern was recognized. For example, the frequency band selector 434 selects the cellular mode for operating the indoor-facing antenna array 405*d.*

At block 1062, the processor 425 switches the first antenna array 450*d* to operate in the WiFi mode based on the recognized occurrence of the identified pattern. The first antenna array 405*d* may not be able to detect the presence of new UEs entering into the WiFi coverage area 520 while in the cellular mode, however, after the first antenna array 405*d* switched to operate in the WiFi mode, the GW 400 is enabled to detect the presence of the UEs that entered into the WiFi coverage area 520. In block 1064, the GW 400 receives location information from a new UE, such as the information 940 from UE2 115 shown in FIG. 9. The procedure performed at block 1064 with respect to the UE2 115 is analogous to the procedure performed at block 1020 with respect to the UE1 116.

At block 1070, the processor 425 forward-transmits to the UE via a second wireless communication channel, the downlink information via a beam formed at the first antenna array to serve the UE at the location of the UE. In a frequency-switching embodiment of the GW 400, as shown in FIG. 9, the processor 425 forward-transmits the downlink information by performing the procedure of block 1072. At block 1072, the processor 425 uses the first antenna array 405*d* to forward-transmit the downlink information (e.g., first traffic 924) over a cellular frequency band of the second wireless communication channel 930, while operating in a cellular mode. In a different embodiment of the GW 400 without frequency-switching, the processor 425 forward-transmits the downlink information by performing the procedure of block 1074, as shown in FIG. 8. At block 1074, the processor 425 the first antenna array 405*a* is configured to forward-transmit the downlink information via a cellular frequency band of the second wireless communication channel.

At block 1080, the processor 425 collects additional information 436 over time to perform a prediction based on a pattern identified in the collected additional information. More particularly, the processor 425 collects, via the prediction engine 432, additional information 436 over time to predict one or more times when no UE is present within a WiFi coverage area 520 of the first antenna. Also, the processor 425 identifies, via the AI prediction engine 432, a pattern in the additional information 436 collected over time, wherein the pattern includes the one or more times when no UE is present within the WiFi coverage area of the first antenna. The pattern(s) identified at block 1080 enable the GW 400 to perform the procedure of block 1050 in a future iteration of the method 1000.

In some embodiments, the GW 400 is able to determine and output a recommendation to a user recommending an optimal number (K) of GWs 400 and 503 to be installed in a particular 3D space (e.g., building 702, level 604 or 606, or room 704). Certain data is needed as a basis upon which to determine the number K. Particularly, at block 1080, the processor 425 collects additional information over time to predict a number of UEs concurrently within a WiFi coverage area 520 of the first antenna 405*a* during a periodic time window. The periodic time window can be a day, a week, or a year.

At block 1090, the processor 425, via the prediction engine 432, determines an optimal number (K) of additional electronic devices to serve the number of UEs concurrently within the WiFi coverage area 520 of the first antenna. 405*a* or 405*d*. As part of determining the optimal number K, the processor 425 increments the number of UEs concurrently within the WiFi coverage area 520 of the first antenna, in response to receiving location information from a new UE. That is, the GW 400 tracks how many UEs are concurrent present in the WiFi coverage area.

As another part of determining the optimal number K, the processor 425 identifies a pattern in the additional information 436 collected over time, wherein the pattern includes the number of UEs concurrently within the WiFi coverage area 520 of the first antenna during the periodic time window and corresponding times during the period time window. For example, if the periodic time window is daily, then, for each respective day during the pre-determined training period, GW 400 stores the maximum count of UEs concurrently within the WiFi coverage area 520 and the GW stores the time at which the count was at that day's maximum.

As another part of determining the optimal number K, the GW 400 determines the extent to which the GW 400 is congested, overloaded, or unable to meet the demands of all UEs detected as being present in the building 602. Particularly, the processor 425 determines a difference value (L) between the total number (M) of UEs concurrently within the WiFi coverage area 520 of the first antenna and a maximum number (N) of beams (e.g., 640, 641, and 642) that the first antenna array is capable of forming to serve at least some of the UEs from among the total number of UEs that are concurrently located in the WiFi coverage area 520.

As a final part of block 1090, the processor 425 determines a number of additional GWs 400 needed to serve the total number of UEs concurrently within the WiFi coverage area 520 of the first antenna, based on the difference value L between the total number M of UEs and the maximum number N of beams available.

Although FIG. 10 illustrates an example method 1000 for implementing a SmarterFi-Gateway technology in the GW 400, various changes may be made to FIG. 10. For example, while shown as a series of steps, various steps in FIG. 10 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

receiving, from a user equipment (UE) via a first wireless communication channel, wireless fidelity (WiFi) signals that include UE location information indicating a location of the UE, wherein the WiFi signals are received by a processor operably connected to a transceiver that includes a first antenna array for communication with the UE and a second antenna array for communication with a base station;

transmitting, to the base station via the second antenna array, uplink data and control information that includes the UE location information, wherein the UE location information transmitted informs the base station to skip forming a downlink beam directed to the location of the UE from among a full set of beams that correspond to a full sector beam sweep;

receiving, from the base station via the second antenna array, downlink information intended for the UE; and forward-transmitting, to the UE via a second wireless communication channel, the downlink information via a beam formed at the first antenna array to serve the UE at the location of the UE.

2. The method of claim 1, wherein the UE location information transmitted indicates the location of the UE associated with use of a subset of beams to reduce a sector beam sweep, and wherein the downlink information intended for the UE is received via a first downlink wireless communication channel that is directed to the second antenna array and is selected based on a result of the reduced sector beam sweep.

3. The method of claim 1, wherein:

receiving the WiFi signals further comprises receiving the WiFi signals, by a third antenna array of the transceiver, via a WiFi frequency band of the first wireless communication channel;

forward-transmitting the downlink information further comprises forward-transmitting the downlink information, by the first antenna array, via a cellular frequency band of the second wireless communication channel; and transmitting uplink data and control information further comprises transmitting, by the second antenna array, the uplink data and control information that includes the UE location information via a third wireless communication channel.

4. The method of claim 1, wherein:

the first antenna array is configured to:

receive the WiFi signals over a WiFi frequency band of the first wireless communication channel, while operating in a WiFi mode; and forward-transmit the downlink information over a cellular frequency band of the second wireless communication channel, while operating in a cellular mode; and the method further comprises:

switching the first antenna array to operate in the WiFi mode or the cellular mode; and transmitting, via a third wireless communication channel associated with the second antenna array, the uplink data and control information that includes the UE location information.

5. The method of claim 4, further comprising:

collecting, via an artificial intelligence (AI) prediction engine (PE), additional information over time to predict one or more times when no UE is present within a WiFi coverage area of the first antenna array;

identifying, via the AI PE, a pattern in the additional information collected over time, wherein the pattern includes the one or more times when no UE is present within the WiFi coverage area of the first antenna array;

recognizing, via the AI PE, an occurrence of the identified pattern, based on a determination that a current time corresponds to the one or more times when no UE is present within the WiFi coverage area of the first antenna array; and switching the first antenna array to operate in the WiFi mode based on the recognized occurrence of the identified pattern.

6. The method of claim 1, further comprising:

collecting, via an artificial intelligence (AI) prediction engine (PE), additional information over time to predict a number of UEs concurrently within a WiFi coverage area of the first antenna array during a periodic time window, wherein the periodic time window includes at least one of a day, a week, or a year;

in response to receiving location information from a new UE, incrementing the number of UEs concurrently within the WiFi coverage area of the first antenna array;

identifying, via the AI PE, a pattern in the additional information collected over time, wherein the pattern includes the number of UEs concurrently within the WiFi coverage area of the first antenna array during a periodic time window and corresponding times during the period time window; and determining, via the AI PE, a number of additional electronic devices to serve the number of UEs concurrently within the WiFi coverage area of the first antenna array, based on a difference between the number of UEs concurrently within the WiFi coverage area of the first antenna array and a maximum number of beams that the first antenna array is capable of forming to serve at least some of the number of UEs.

7. The method of claim 1, wherein:

the first antenna array is configured to operate in an indoor environment; and the second antenna array is configured to operate in an outdoor environment.

8. An electronic device comprising:

a transceiver that includes:

a first antenna array for communication with a user equipment (UE); and a second antenna array for communication with a base station; and a processor operably connected to the transceiver and configured to:

receive, from the UE via a first wireless communication channel, wireless fidelity (WiFi) signals that include information indicating a location of the UE;

transmit, to the base station via the second antenna array, uplink data and control information that includes the UE location information, wherein the UE location information transmitted informs the base station to skip forming a downlink beam directed to the location of the UE from among a full set of beams that correspond to a full sector beam sweep;

receive, from the base station via the second antenna array, downlink information intended for the UE; and forward-transmit, to the UE via a second wireless communication channel, the downlink information via a beam formed at the first antenna array to serve the UE at the location of the UE.

9. The electronic device of claim 8, wherein the UE location information transmitted indicates the location of the UE associated with use of a subset of beams to reduce a sector beam sweep, wherein the downlink information intended for the UE is received via a first downlink wireless communication channel selected based on a result of the reduced sector beam sweep.

10. The electronic device of claim 8, wherein:

the transceiver further includes a third antenna array configured to receive the WiFi signals via a WiFi frequency band of the first wireless communication channel;

the first antenna array is configured to forward-transmit the downlink information via a cellular frequency band of the second wireless communication channel; and the second antenna array is configured to transmit the uplink data and control information that includes the UE location information via a third wireless communication channel.

11. The electronic device of claim 8, wherein:

the first antenna array is configured to:

receive the WiFi signals over a WiFi frequency band of the first wireless communication channel, while operating in a WiFi mode; and forward-transmit the downlink information over a cellular frequency band of the second wireless communication channel, while operating in a cellular mode; and the processor is further configured to:

switch the first antenna array to operate in the WiFi mode or the cellular mode; and transmit, via a third wireless communication channel associated with the second antenna array, the uplink data and control information that includes the UE location information.

12. The electronic device of claim 11, wherein the processor is further configured to:

collect, via an artificial intelligence (AI) prediction engine (PE), additional information over time to predict one or more times when no UE is present within a WiFi coverage area of the first antenna array;

identify, via the AI PE, a pattern in the additional information collected over time, wherein the pattern includes the one or more times when no UE is present within the WiFi coverage area of the first antenna array;

recognize, via the AI PE, an occurrence of the identified pattern, based on a determination that a current time corresponds to the one or more times when no UE is present within the WiFi coverage area of the first antenna array; and switch the first antenna array to operate in the WiFi mode based on the recognized occurrence of the identified pattern.

13. The electronic device of claim 8, wherein the processor, via an artificial intelligence (AI) prediction engine (PE), is further configured to:

collect additional information over time to predict a number of UEs concurrently within a WiFi coverage area of the first antenna array during a periodic time window, wherein the periodic time window includes at least one of a day, a week, or a year;

in response to receiving location information from a new UE, incrementing the number of UEs concurrently within the WiFi coverage area of the first antenna array;

identify a pattern in the additional information collected over time, wherein the pattern includes the number of UEs concurrently within the WiFi coverage area of the first antenna array during a periodic time window and corresponding times during the period time window; and determine a number of additional electronic devices to serve the number of UEs concurrently within the WiFi coverage area of the first antenna array, based on a difference between the number of UEs concurrently within the WiFi coverage area of the first antenna array and a maximum number of beams that the first antenna array is capable of forming to serve at least some of the number of UEs.

14. The electronic device of claim 8, wherein:

the first antenna array is configured to operate in an indoor environment; and the second antenna array is configured to operate in an outdoor environment.

15. A non-transitory, computer readable medium embodying a computer program, the computer program comprising computer readable program code that, when executed by a processor of an electronic device, causes the electronic device to:

receive, from a user equipment (UE) via a first wireless communication channel, wireless fidelity (WiFi) signals that include information indicating a location of the UE, wherein the WiFi signals are received by the processor operably connected to a transceiver that includes a first antenna array for communication with the UE and a second antenna array for communication with a base station;

transmit, to the base station via the second antenna array, uplink data and control information that includes the UE location information, wherein the UE location information transmitted informs the base station to skip forming a downlink beam directed to the location of the UE from among a full set of beams that correspond to a full sector beam sweep;

receive, from the base station via the second antenna array, downlink information intended for the UE; and forward-transmit, to the UE via a second wireless communication channel, the downlink information via a beam formed at the first antenna array to serve the UE at the location of the UE.

16. The non-transitory, computer readable medium of claim 15, wherein the UE location information transmitted indicates the location of the UE associated with use of a subset of beams to reduce a sector beam sweep, wherein the downlink information intended for the UE is received via a first downlink wireless communication channel selected based on a result of the reduced sector beam sweep.

17. The non-transitory, computer readable medium of claim 15, wherein:

the transceiver further includes a third antenna array configured to receive the WiFi signals via a WiFi frequency band of the first wireless communication channel;

the first antenna array is configured to forward-transmit the downlink information via a cellular frequency band of the second wireless communication channel; and the second antenna array is configured to transmit the uplink data and control information that includes the UE location information via a third wireless communication channel.

18. The non-transitory, computer readable medium of claim 15, wherein:

the first antenna array is configured to:

receive the WiFi signals over a WiFi frequency band of the first wireless communication channel, while operating in a WiFi mode; and forward-transmit the downlink information over a cellular frequency band of the second wireless communication channel, while operating in a cellular mode; and the program code that, when executed, causes the electronic device to:

switch the first antenna array to operate in the WiFi mode or the cellular mode; and transmit, via a third wireless communication channel associated with the second antenna array, the uplink data and control information that includes the UE location information.

19. The electronic device of claim 18, the program code that, when executed, causes the electronic device to:

collect, via an artificial intelligence (AI) prediction engine (PE), additional information over time to predict one or more times when no UE is present within a WiFi coverage area of the first antenna array;

identify, via the AI PE, a pattern in the additional information collected over time, wherein the pattern includes the one or more times when no UE is present within the WiFi coverage area of the first antenna array;

recognize, via the AI PE, an occurrence of the identified pattern, based on a determination that a current time corresponds to the one or more times when no UE is present within the WiFi coverage area of the first antenna array; and switch the first antenna array to operate in the WiFi mode based on the recognized occurrence of the identified pattern.

20. The non-transitory, computer readable medium of claim 15, wherein the program code that, when executed, causes the electronic device, via an artificial intelligence (AI) prediction engine (PE), to:

collect additional information over time to predict a number of UEs concurrently within a WiFi coverage area of the first antenna array during a periodic time window, wherein the periodic time window includes at least one of a day, a week, or a year;

in response to receiving location information from a new UE, incrementing the number of UEs concurrently within the WiFi coverage area of the first antenna array;

identify a pattern in the additional information collected over time, wherein the pattern includes the number of UEs concurrently within the WiFi coverage area of the first antenna array during a periodic time window and corresponding times during the period time window; and determine a number of additional electronic devices to serve the number of UEs concurrently within the WiFi coverage area of the first antenna array, based on a difference between the number of UEs concurrently within the WiFi coverage area of the first antenna array and a maximum number of beams that the first antenna array is capable of forming to serve at least some of the number of UEs.

* * * * *